(12) United States Patent
Tarascon et al.

(10) Patent No.: US 9,293,767 B2
(45) Date of Patent: Mar. 22, 2016

(54) FLUOROSULPHATES USEFUL AS ELECTRODE MATERIALS

(75) Inventors: Jean-Marie Tarascon, Mennecy (FR); Nadir Recham, Amiens (FR); Michel Armand, Paris (FR)

(73) Assignees: CENTRE NATIONAL DE LA RECHERCHE SCIENTIFIQUE, Paris (FR); UNIVERSITE DE PICARDIE JULES VERNE, Amiens (FR)

( * ) Notice: Subject to any disclaimer, the term of this patent is extended or adjusted under 35 U.S.C. 154(b) by 1133 days.

(21) Appl. No.: 13/124,723

(22) PCT Filed: Oct. 23, 2009

(86) PCT No.: PCT/FR2009/052040
§ 371 (c)(1),
(2), (4) Date: Oct. 4, 2011

(87) PCT Pub. No.: WO2010/046610
PCT Pub. Date: Apr. 29, 2010

(65) Prior Publication Data
US 2012/0129050 A1   May 24, 2012

(30) Foreign Application Priority Data

Oct. 23, 2008   (FR) ..................................... 08 05875
May 28, 2009   (FR) ..................................... 09 53529
Jul. 27, 2009   (FR) ..................................... 09 55233

(51) Int. Cl.
*H01M 4/48* (2010.01)
*H01M 4/58* (2010.01)
(Continued)

(52) U.S. Cl.
CPC ............. *H01M 4/5825* (2013.01); *C01B 25/26* (2013.01); *C01B 25/37* (2013.01); *C01B 25/45* (2013.01); *C01B 25/455* (2013.01); *C01B 33/20* (2013.01); *C01G 1/10* (2013.01); *C01G 49/009* (2013.01); *C01G 51/006* (2013.01); *C01G 53/006* (2013.01); *H01M 4/582* (2013.01);
(Continued)

(58) Field of Classification Search
CPC .. H01M 4/5825; H01M 4/582; H01M 10/052
See application file for complete search history.

(56) References Cited

U.S. PATENT DOCUMENTS

2005/0163699 A1   7/2005   Barker et al.

FOREIGN PATENT DOCUMENTS

DE   102006011754   9/2007

OTHER PUBLICATIONS

Search Report dated Oct. 23, 2009.
(Continued)

*Primary Examiner* — Helen O Conley
(74) *Attorney, Agent, or Firm* — Sofer & Haroun, LLP

(57) ABSTRACT

A material is made up of particles of an optionally-doped fluorosulphate. The fluorosulphate has a distorted Tavorite type structure of formula $(A_{1-a}A'_a)x(Z_{1-b}Z'_b)z(SO_4)_sF_f$ (I) where A=Li or Na, A' 0 a hole or at least one doping element, Z=at least one element selected from Fe, Co and Ni, Z'=a hole or at least one doping element, the indices a, b, x, z, s, and f are selected to assure the electroneutrality of the compound and $a≥0, b≥0, x≥0, z>0, s>0, f>0$, the respective quantities a and b of dopant A and Z' being such that the Tavorite type structure is preserved. The material is obtained from the precursors thereof by an ionothermal route or ceramic route in a closed reactor. The material is of particular use as an active electrode material.

12 Claims, 17 Drawing Sheets

(51) Int. Cl.
*C01B 25/26* (2006.01)
*C01B 25/37* (2006.01)
*C01B 25/45* (2006.01)
*C01B 25/455* (2006.01)
*C01B 33/20* (2006.01)
*C01G 1/10* (2006.01)
*C01G 49/00* (2006.01)
*C01G 51/00* (2006.01)
*C01G 53/00* (2006.01)
*H01M 10/052* (2010.01)

(52) U.S. Cl.
CPC ......... *C01P2002/54* (2013.01); *C01P 2002/72* (2013.01); *C01P 2002/77* (2013.01); *C01P 2002/88* (2013.01); *C01P 2004/04* (2013.01); *C01P 2006/40* (2013.01); *H01M 10/052* (2013.01); *Y10T 428/2982* (2015.01)

(56) References Cited

OTHER PUBLICATIONS

Synthesis, crystal structure and lithium ion conductivity of LiMgFSO4.
A Symmetrical Lithium-Ion Cell Based on Lithium Vanadium Flourophosphate LiVP04F.
The x-ray crystallography of tavorite from the Tip Top pegamatite, Custer, South Dakota.

FLUOROSULPHATES USEFUL AS ELECTRODE MATERIALS

RELATED APPLICATIONS

This application is a National Phase application of PCT/FR2009/052040, filed on Oct. 23, 2009, which in turn claims the benefit of priority from French Patent Application Nos. 08 05875, filed on Oct. 23, 2008; 09 53529, filed on May 28, 2009; and 09 55233, filed on Jul. 27, 2009, the entirety of which are incorporated herein by reference.

The present invention relates to a fluorinated material that can be used as an electrode active material, and also to a process for the production thereof.

PRIOR ART

Lithium batteries are known which use an insertion compound as a basis for the operation of the positive electrode, such as $Li_xCoO_2$, $0.4 \leq x \leq 1$ which is used pure or in solid solution with nickel and manganese and aluminum. The main obstacles to the generalization of this type of electrochemistry are the rarity of cobalt and the excessively positive potential of the transition oxides, with, as consequences, safety problems for the battery.

$Li_xT^M{}_mZ_yP_{1-s}O_4$ compounds ("oxyanions") are also known in which $T^M$ is chosen from Fe, M and Co, and Z represents one or more elements that have a valence between 1 and 5 and that may be substituted into the sites of the transition metals or of the lithium. These compounds exchange only the lithium and have only a very low electronic and ionic conductivity. These handicaps may be overcome by the use of very fine particles (such as nanoparticles and by the deposition of a carbon coating by pyrolysis of organic compounds. The drawbacks associated with the use of nanoparticles are a low tap density which results in a loss of specific energy, and this problem is further aggravated by the deposition of carbon. Furthermore, the deposition of carbon takes place at high temperature, under reducing conditions. In practice, it is difficult to use transition elements other than $Fe^{II}$ and $Mn^{II}$, the elements $Co^{II}$ and $Ni^{II}$ being readily reduced to the metallic state. The same applies for $Fe^{III}$, $Mn^{III}$, $Cr^{III}$, $V^{III}$ and $V^{IV}$ which are advantageous dopants for increasing the ionic or electronic conductivity.

Other compounds have been proposed, especially compounds corresponding to the general formula $A_aM_b(SO_4)_cZ_d$ in which A represents at least one alkali metal. Z represents at least one element chosen from F and OH, and M represents at least one divalent or trivalent metal cation. L. Sebastian et al., [J. Mater. Chem. 2002, 374-377] describe the preparation of $LiMgSO_4F$ via a ceramic route, and also the crystallographic structure of said compound which is isotypic of the structure of tavorite $LiFeOHPO_4$. The authors mention the high ionic conduction of this compound, and suggest that the compounds $LiMSO_4F$ in which M is Fe, Co or Ni, which would be isostructural, appear to be significant for the redox insertion/extraction of lithium involving $M^{II}/M^{III}$ oxidation states. The authors also specify that the preparation of the compounds of Fe, Ni or Co via a ceramic route is in progress, but no subsequent publication regarding these compounds has been made.

Moreover, US-2005/0163699 describes the preparation, via a ceramic route, of the aforementioned compounds $A_aM_b(SO_4)_cZ_d$. The technique is illustrated by concrete examples regarding compounds in which M is Ni, Fe, Co, Mn, (MnMg), (FeZn), or (FeCo). These compounds are prepared, via a ceramic route, from LiF, precursor of Li, and from the sulfate of the M element or elements. Among these compounds, the most advantageous are the compounds that contain Fe, since besides their relatively low cost, they are capable, on the basis of structural and chemical considerations (especially the ionocovalence of the bonds), of exhibiting advantageous electrochemical properties over a range of potential that is desirable for guaranteeing a reliable use for large-volume applications. For reasons of inductive effect, the sulfates should have higher potentials from the phosphates, regardless of their structure. Examples for preparing compounds containing various metallic elements are described, but no electrochemical property is reported. Thus, example 2 describes the preparation of an $LiFeSO_4F$ compound via a ceramic method at 600° C. which wives a non-homogenous compound, then 500° C. where the compound is red/black, or else at 400° C. in air where the compound is red. This method is capable of enabling the reduction of the $SO_4^{2-}$ group by $Fe^{2+}$ in the absence of oxygen according to: $SO_4^{2-}+Fe^{2+} \Rightarrow SO_2+ 2O^{2-}2Fe^{3+}$. The red color observed in the compounds obtained at the various temperatures is due to the $O^{2-}/Fe^{3+}$ association in a crystal lattice such as the oxide $Fe_2O_3$. It is furthermore known that the compounds of $Fe^{II}$ oxidize in air from 200° C. giving $Fe^{III}$, and the preparation from example 2 at 400° C. in air confirms it. The compounds containing iron that are prepared via a ceramic route starting from LiF and iron sulfate according to US-2005/0163699 do not therefore consist of $LiFeSO_4F$. Similarly, it appears that the compounds in which M is Co, Ni are not stable at the temperatures used during the recommended preparation via a ceramic route. It is not therefore plausible that the compounds described in US-2005/0163699 have actually been obtained.

INVENTION

The objective of the present invention is to provide a novel electrode material having an improved electrochemical activity close to the theoretical capacity (that is to say a material capable of inserting one alkali metal ion per fluorinated oxyanion unit), and also a process that makes it possible to produce said material in a reliable, rapid and economical manner.

The material of the present invention consists of particles of a fluorosulfate which has a distorted tavorite-type structure and which corresponds to the following formula (I):

$$(A_{1-a}A'_a)_x(Z_{1-b}Z'_b)_z(SO_4)_sF_f \qquad (I)$$

in which:
A represents Li or Na;
A' represents a vacancy or at least one dopant element;
Z represents at least one element chosen from Fe, Co and Ni;
Z' represents a vacancy or at least one dopant element;
the indices a, b, x, z, s, and f are chosen so as to ensure the electroneutrality of the compound, and $a \geq 0$, $b \geq 0$, $x \geq 0$, $z > 0$, $s > 0$, $f > 0$;
the respective amounts a and b of dopant A and Z' are such that the tavorite-type structure is preserved.

The tavorite structure comprises $ZO_4F_2$ octahedra centered about Z connected by apical fluorines forming chains along the c axis. The octahedra all have F atoms in the trans position, but they are divided into two different types. The chains are connected together via isolated. $SO_4$ tetrahedra, thus creating a three-dimensional structure and defining tunnels along the [100], [010] and [101] axis, the $A_{1-a}A'_a$ element of a compound (I) lodging in said tunnels (3D diffusion).

When A is Li, the distorted tavorite-type structure of compound (I) has a triclinic lattice of space group P-1. When A is Na, the distorted tavorite-type structure of compound (I) has a monoclinic lattice ($P2_1/C$).

FIGS. 10, 11, 12 and 13 represent the X-ray diffraction diagram of the LiFeSO$_4$F material obtained respectively in examples 2, 3, 4 and 5.

Figure 14:
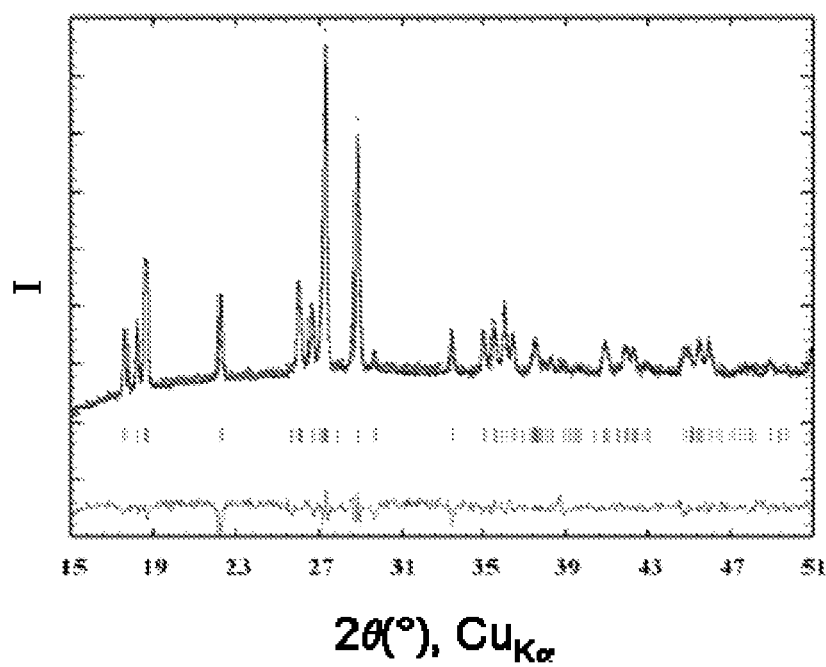
Figure 15:
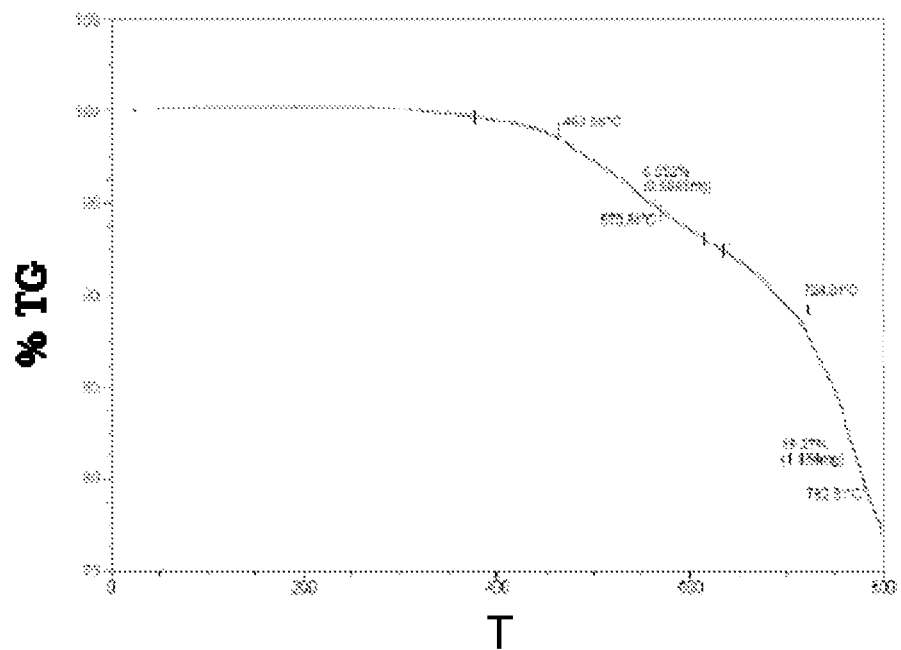

FIGS. 14 and 15 represent the X-ray diffraction diagram and the diagram obtained during the characterization by TGA of the LiCoSO$_4$F material from example 6.

Figure 16:
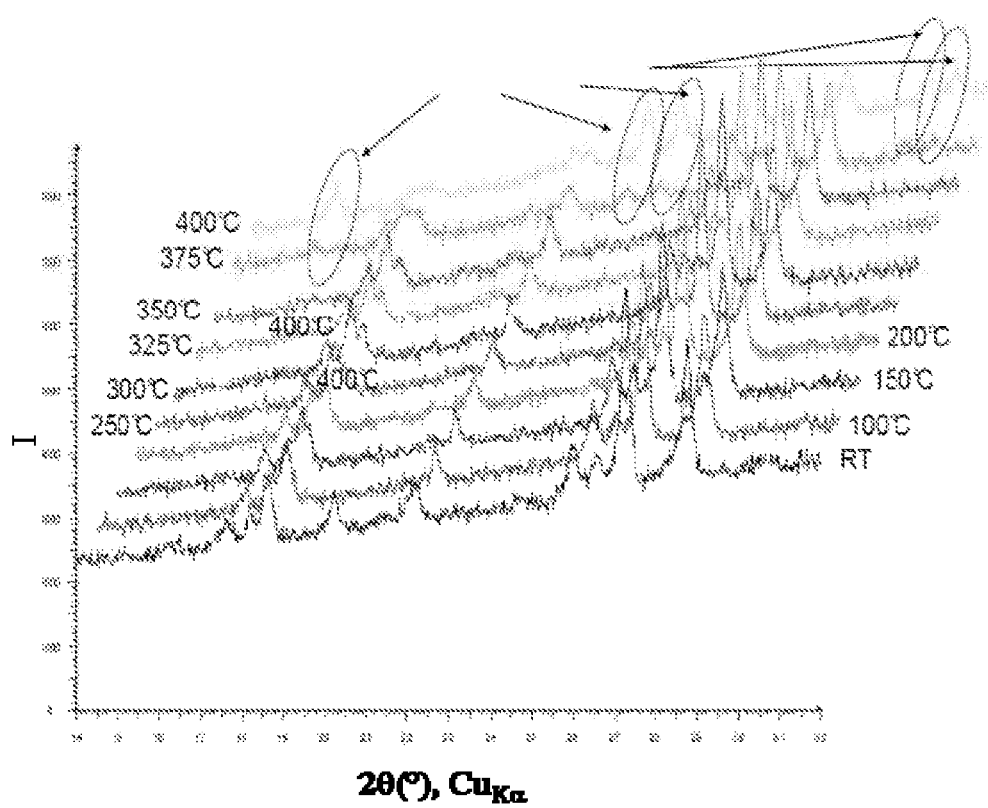

FIG. 16 represents the change in the X-ray diffraction diagram during the increase in the temperature, for a sample of LiCoSO$_4$F.

Figure 17:
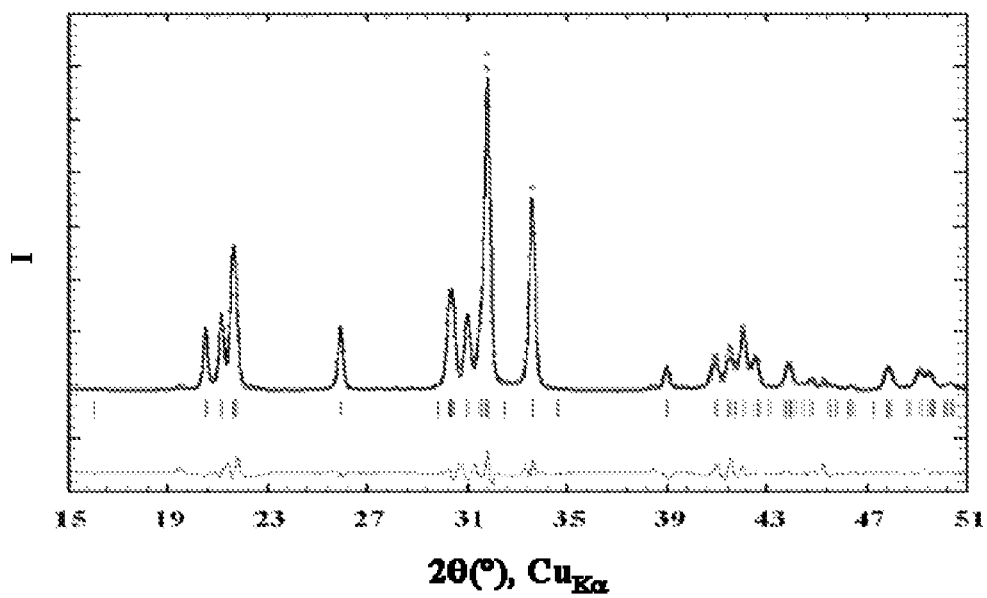
Figure 18:
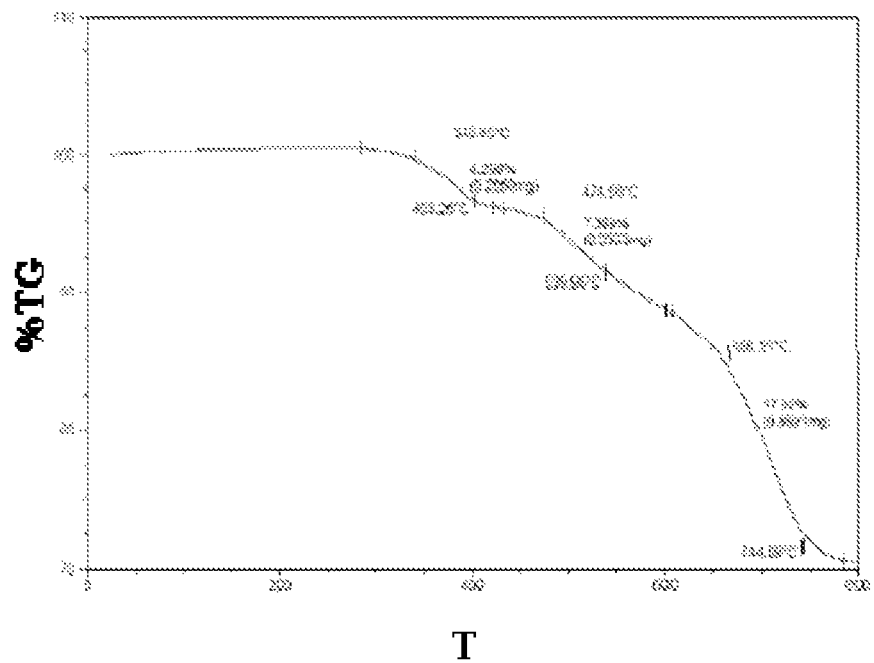

FIGS. 17 and 18 respectively represent the X-ray diffraction diagram and the diagram obtained during the characterization by TGA of the LiNiSO$_4$F material from example 7.

Figure 19:
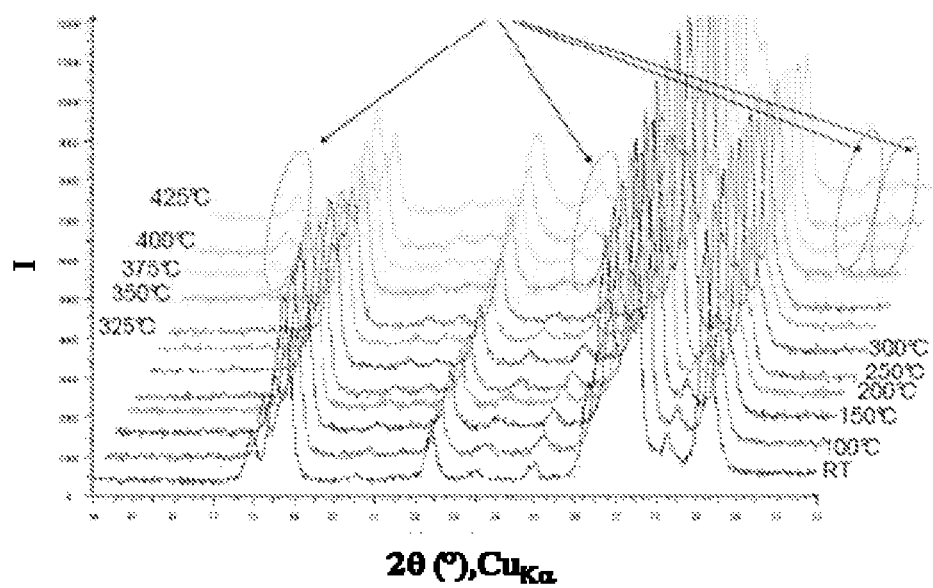

FIG. 19 represents the change in the X-ray diffraction diagram during the increase in the temperature, for a sample of LiNiSO$_4$F.

Figure 20:
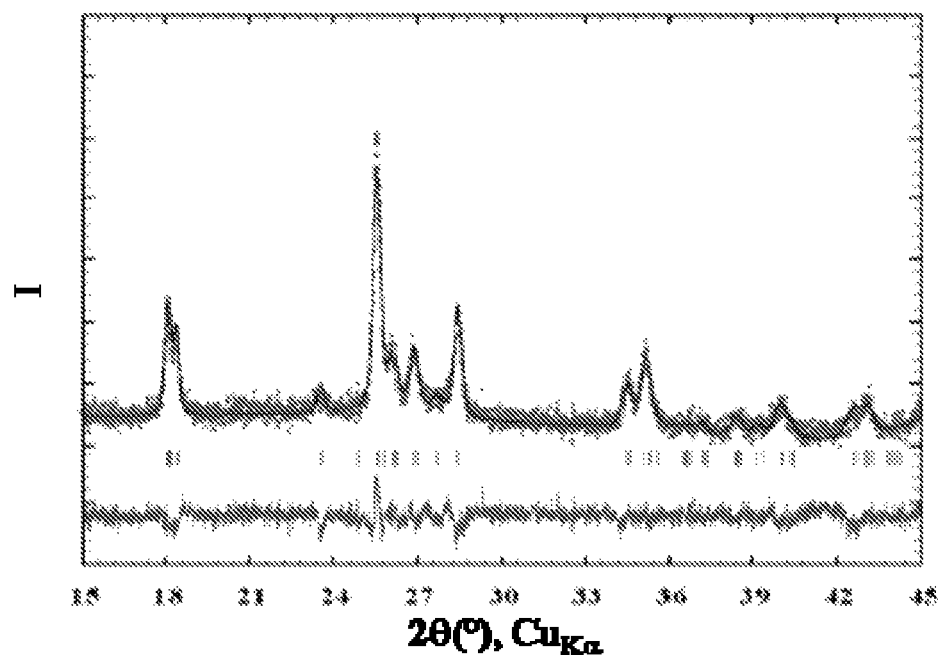
Figure 21:
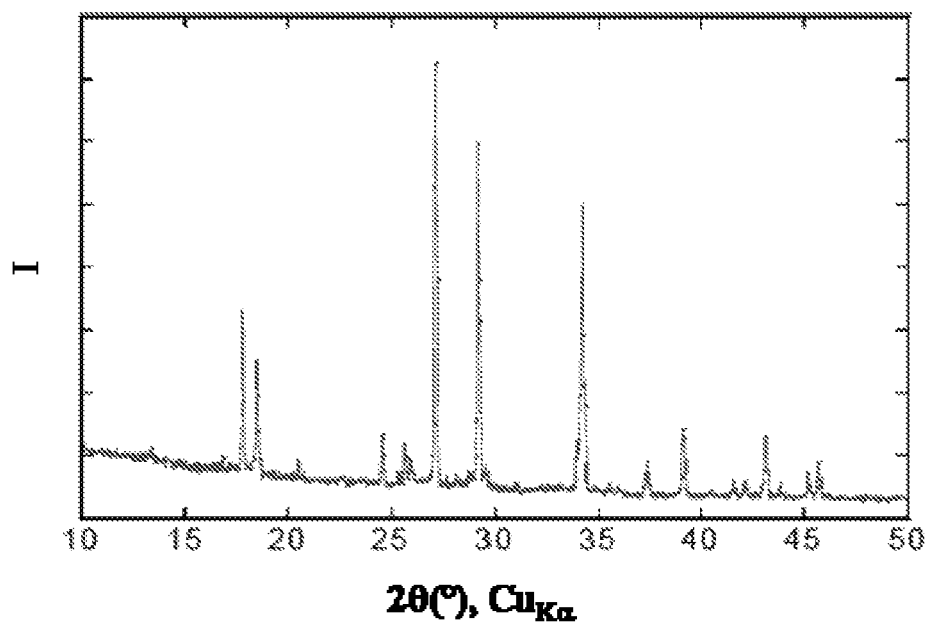

FIGS. 20 and 21 represent the X-ray diffraction diagram respectively of the material Fe$_{0.5}$Mn$_{0.5}$SO$_4$.H$_2$O from example 8 and of the material NaFeSO$_4$F from example 9.

Figure 22:
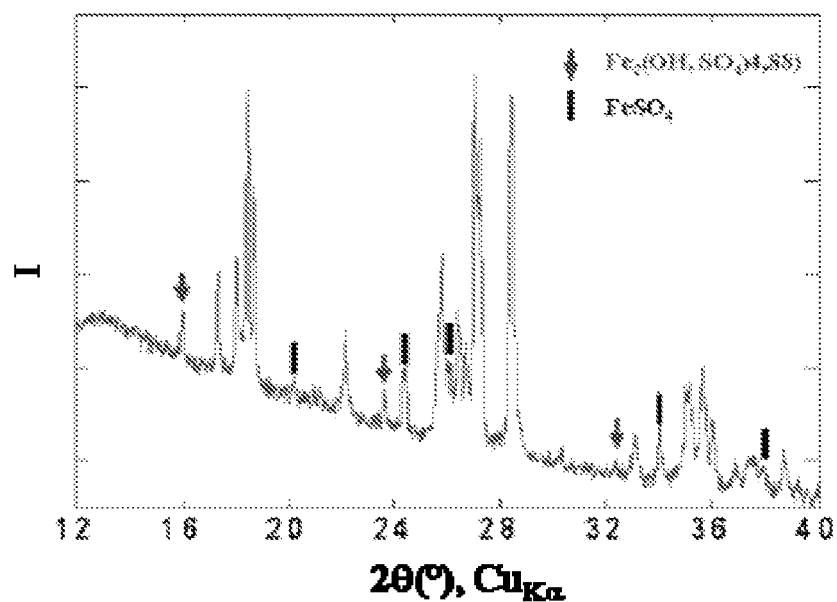
Figure 23:
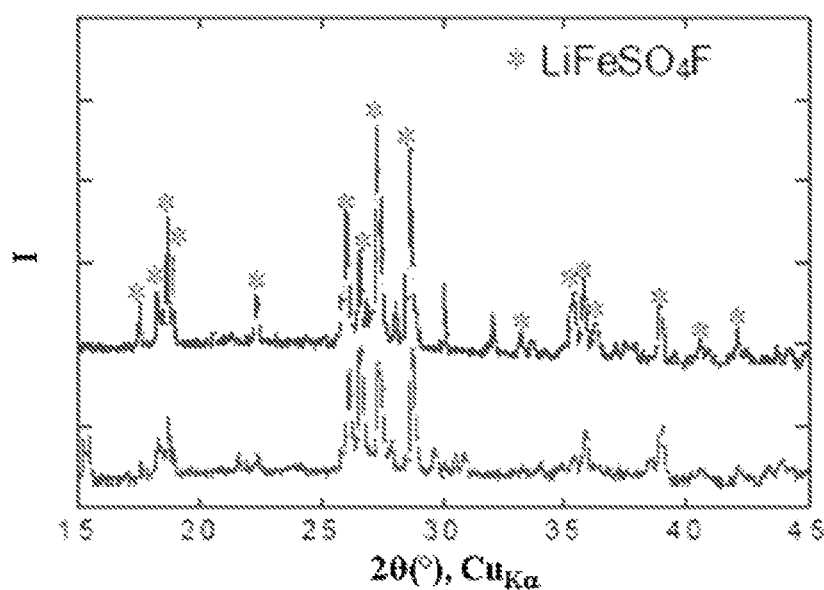

FIGS. 22 and 23 represent the X-ray diffraction diagram of the LiFeSO$_4$F material obtained respectively in examples 10 and 11.

Figure 24:
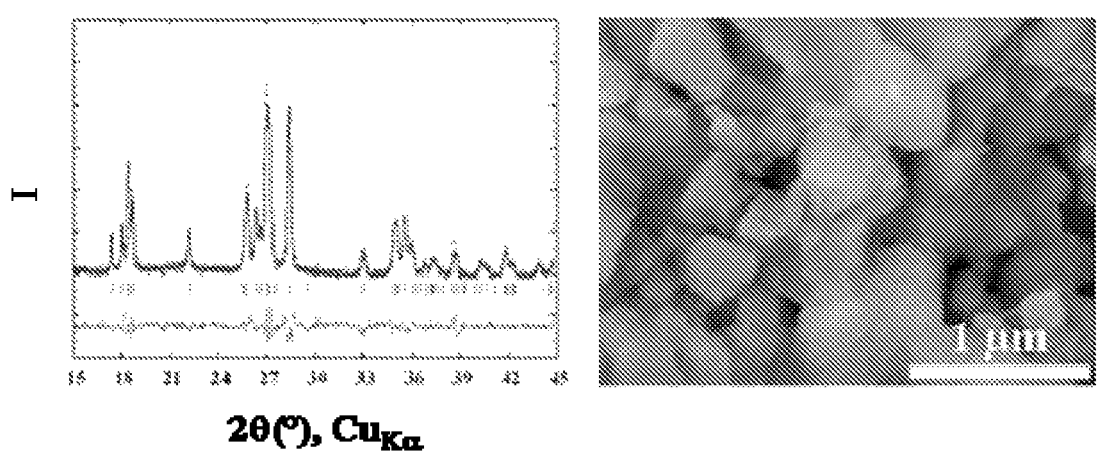

FIG. 24 represents, on the left, the X-ray diffraction diagram of the LiFeSO$_4$F material obtained, in example 12 and, on the right, an SEM micrograph of said material.

Figure 25:
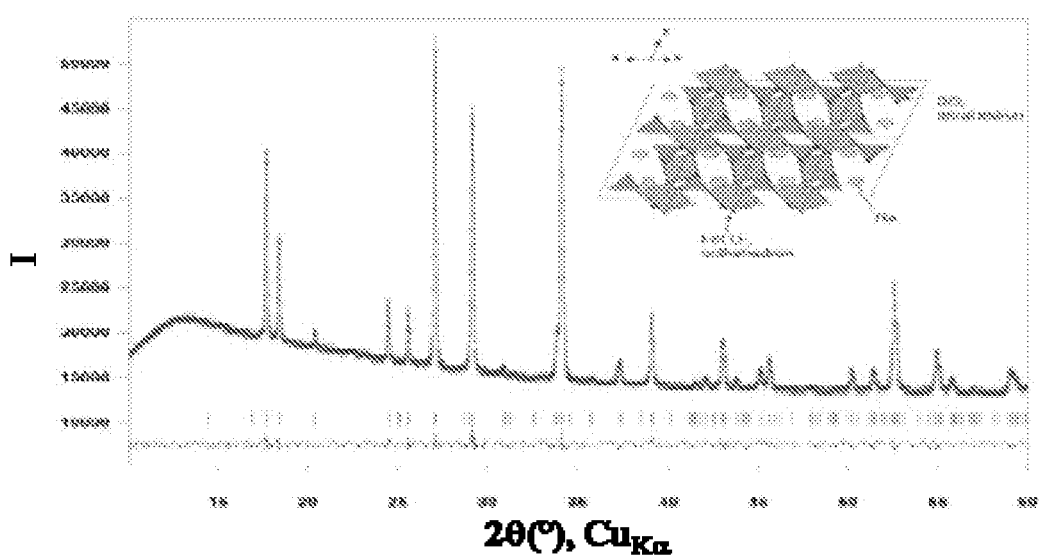
Figure 26:
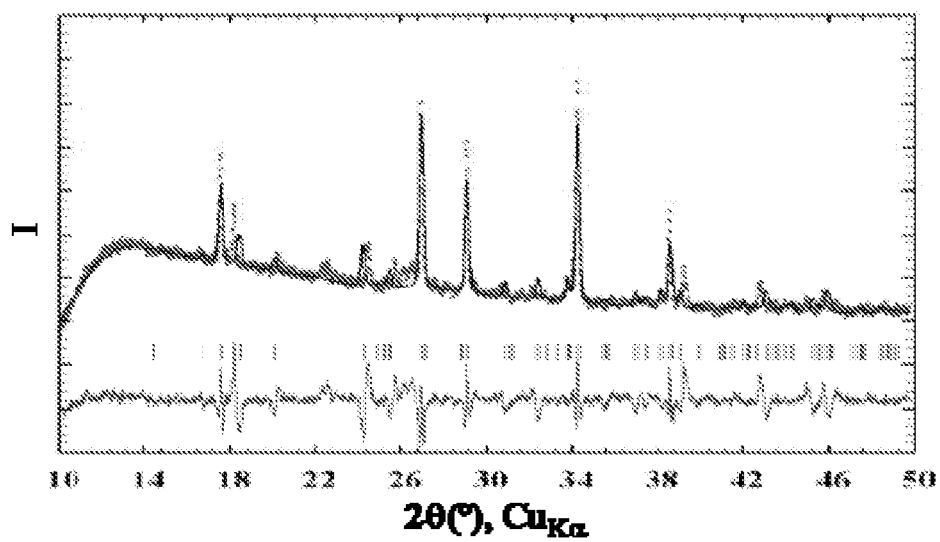
Figure 27:
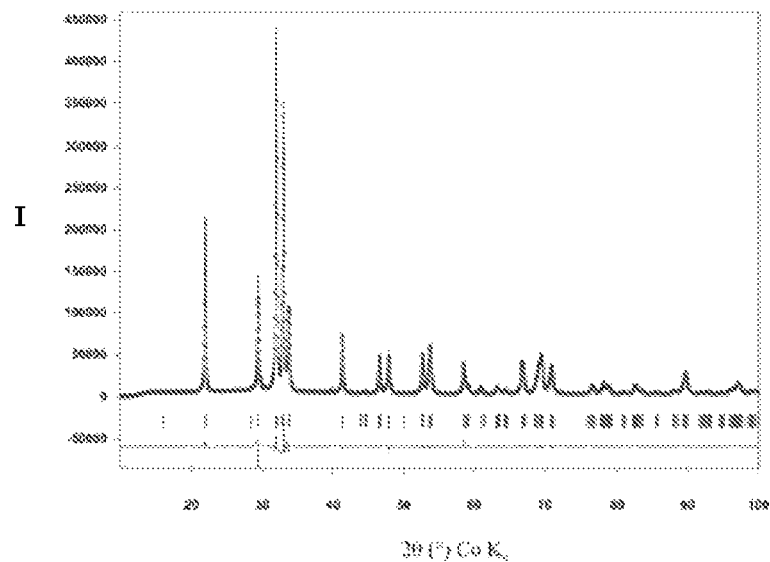

FIGS. 25, 26 and 27 represent the X-ray diffraction diagram respectively of the NaFeSO$_4$F material from example 13, of the NaCoSO$_4$F material from example 14 and of the FeSO$_4$F material from example 15.

Figure 28A:
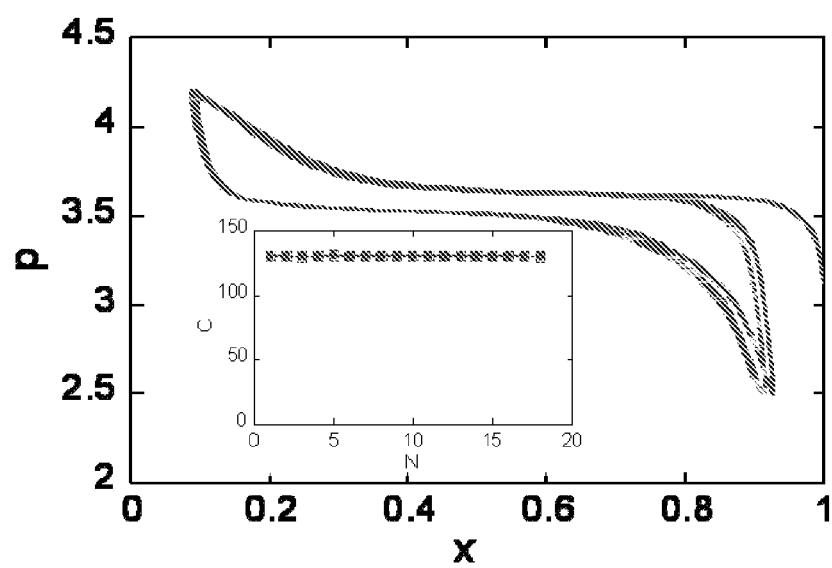
Figure 28B:
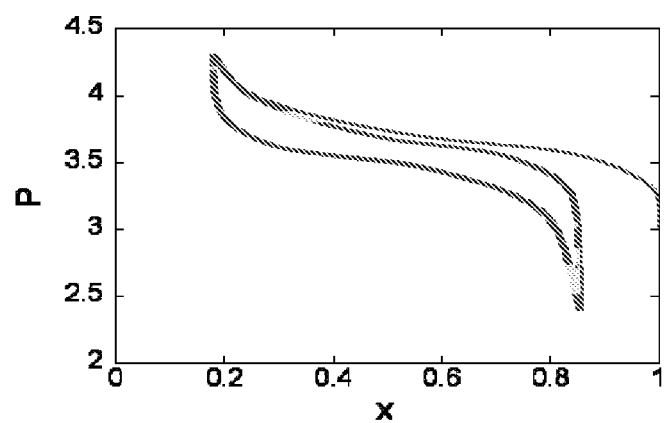
Figure 28C:
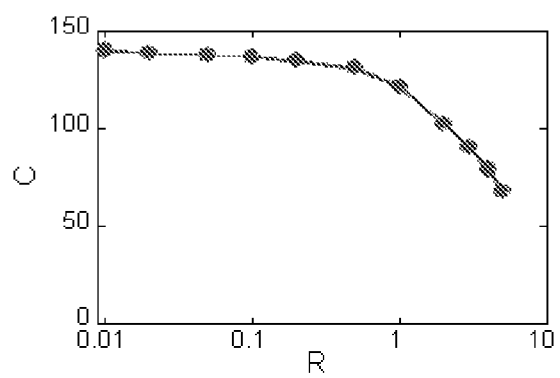

FIGS. 28a, b and c relate to several samples of LiFeSO$_4$F prepared according to example 3. FIG. 28a represents the variation in the potential (in V) as a function of the insertion rate x of lithium and (in the form of an insert) the variation in the capacity C (in mAh/g) as a function of the number of cycles N at a C/10 regime. FIG. 28b represents the variation in the potential (in V) as a function of the insertion rate x of lithium at a C/2 regime. FIG. 28c represents the variation in the capacity as a function of the regime R.

Figure 29:
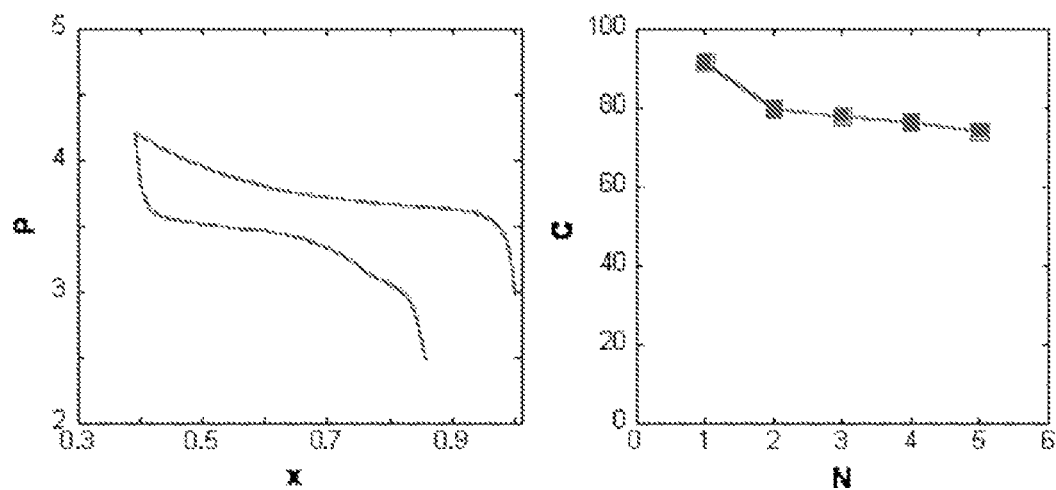

FIG. 29 represents the variation in the potential P (in V) as a function of the insertion rate x of lithium (left-hand curve) and the variation of the capacity C (in mAh/g) as a function of the number of cycles N (right-hand curve) for the LiFeSO$_4$ material from example 12.

Figure 30:
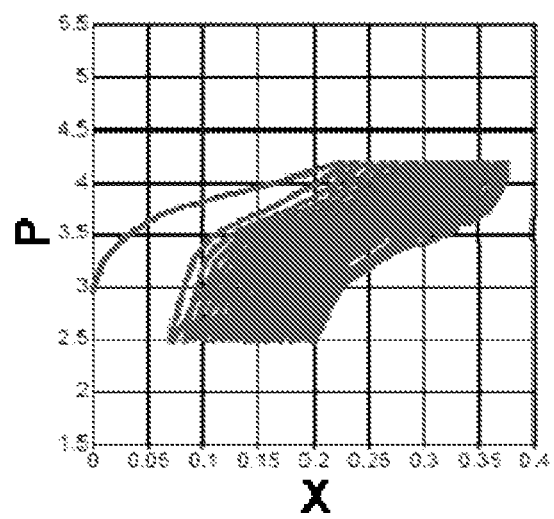

FIG. 30 represents the variation in the potential P (in V) as a function of the insertion rate x of lithium for the NaFeSO$_4$F material from example 13.

In all the X-ray diffraction diagrams, the intensity I (in arbitrary units) is given on the y-axis, and the wavelength 2θ is given on the x-axis.

In the TGA diagrams, % TG indicates the weight loss as a function of the temperature T (in ° C.) and optionally DSC indicates the amount of energy in (mW).

A compound according to the invention is in the form of grains, the dimension of which is less than 100 µm, or even less than 1.00 nm.

When A' is a dopant element, A' may be an alkali metal different from A, an alkaline-earth metal or a 3d metal, in particular Ti, V, Cr, Mn, Fe, Mn, Co or Cu. Generally, the "a" content of dopant A' is preferably less than 0.25%, that is to say a<0.25.

When Z' is a dopant element, Z' may be a metal chosen from alkali metals, Mn, Mg, Co, Sc, Ti, V, Cr, Zn, Al, Ga, Zr, Nb and Ta in at least one of their degrees of oxidation. Generally, the "b" content of dopant Z' is preferably less than 25%, that is to say b<0.25. Particularly advantageous Z' dopants are Mn, Mg, Zn, Ti and Al.

Compounds according to the invention that are particularly preferred are those which correspond to the formulae Li(Z$_{1-b}$Z'$_b$)SO$_4$F and Na(Z$_{1-b}$Z'$_b$)$_z$SO$_4$F, in particular LiFeSO$_4$F, LiCoSO$_4$F, LiNiSO$_4$F, and their solid solutions, NaFeSO$_4$F, NaCoSO$_4$F, NaNiSO$_4$F and their solid solutions, and also the solid solutions Li(Z$_{1-b}$Mn$_b$)SO$_4$F and Na(Z$_{1-b}$Z'$_b$)SO$_4$F in which Z is Fe, Co or Ni, b≤0.2.

One particular category of compounds (I) comprises the compounds in which the (Z$_{1-b}$Z'$_b$) group represents more than one element. These are compounds in which Z represents more than one element chosen from Fe, Co and Ni, and also compounds in which b≠0, the two cases possibly being combined.

A compound (I) in which x=0, that is to say a compound of formula (Z$_{1-b}$Z'$_b$)$_z$(SO$_4$)$_s$F$_f$, in particular a compound ZSO$_4$F, more particularly FeSO$_4$F is advantageous because it makes it possible to construct primary electrochemical generators in the charged state with a lithium anode and a liquid or gel type electrolyte, or secondary generators, in particular with polymer electrolytes.

A material (I) according to the invention in which x>0 may be obtained from precursors of the elements which form it, via a ceramic route or via an ionothermal route.

The precursor of A or of A' may be chosen from inorganic acid salts (such as carbonates and hydrogen carbonates, hydroxides, peroxides and nitrates), volatile organic acid salts (such as acetates and formates), heat-decomposable acid salts (such as oxalates, malonates and citrates), fluorides and sulfates. Among such precursors, Li$_2$CO$_3$, LiHCO$_3$, LiOH, Li$_2$O, Li$_2$O$_2$, LiNO$_3$, LiCH$_3$CO$_2$, LiCHO$_2$, Li$_2$C$_2$O$_4$, Li$_3$C$_6$H$_5$O$_7$, Na$_2$CO$_3$, NaOH, Na$_2$O$_2$, NaNO$_3$, NaCH$_3$CO$_2$, NaCHO$_2$, Na$_2$C$_2$O$_4$, Na$_3$C$_6$H$_5$O$_7$, and hydrates thereof are preferred in particular. The precursors of Li or Na that provide at least two constituents of the final product such as fluorides and sulfates are particularly preferred, especially LiF, NaF, LiHSO$_4$ and the sulfates Li$_2$SO$_4$, Na$_2$SO$_4$ and NaHSO$_4$ in hydrated form.

The precursor of a Z or Z' element is preferably chosen from the sulfates of Z or of Z' that have a tavorite-type structure and that will make it possible to obtain the tavorite-type structure of compound (I).

When the precursors of A, of A', of Z or of Z' do not provide any F or S elements, or provide an insufficient amount with respect to the stoichiometry of compound (I) to be prepared, it is possible to add precursors providing solely one or several F or S elements.

The precursors of the oxyanion $SO_4^{2-}$ may be chosen from the acid $H_2SO_4$, and its thermolabile ammonium, amine, imidazole or pyridine salts such as, for example, $NH_4HSO_4$, $(NH_4)_2SO_4$, $(C_3H_5)HSO_4$, $(C_5H_6)_2SO_4$ and $(C_3H_5)_2SO_4$, $(C_5H_6)HSO_4$.

The precursors of S may also be chosen from the salts of Mg or Ca. By way of example, mention may be made of the compounds $A''(HSO_4)_2$, and $A''SO_4$, $A''HPO_4$, and $A''_2P_2O_7$, $A''(PO_3)_2$ in which $A''$ represents an alkaline-earth metal (Mg, Ca).

The fluoride ion precursors may be chosen from ammonium fluorides ($NH_4F.nHF$), imidazolium fluorides ($C_3H_5N_2F.nHF$) or pyridinium fluorides ($C_5H_6NF.nHF$) $0 \leq n \leq 5$. Of course, it is possible to use several precursors for the same element.

In one particularly preferred embodiment, the precursor of Z and, where appropriate, the precursor of Z' are chosen from the sulfates of the Z and/or Z elements. The precursor of A and, where appropriate, the precursor of A' are chosen from the fluorides of the A an/or A' elements. Preferably, use is made of sulfates in hydrate form, in particular in monohydrate form. It has been observed that, surprisingly, the use of a sulfate monohydrate precursor that has a distorted tavorite-type structure makes it possible to retain the more or less distorted tavorite-type structure during the reaction with the fluoride.

The reaction is topotactic due to the structural relationship between $ZSO_4.H_2O$ and the corresponding Li and Na phases, based on maintaining the general arrangement of the $SO_4$ tetrahedra and $ZO_4F_2$ octahedra in the structural framework.

The monohydrate $ZSO_4.H_2O$ may be obtained from $ZSO_4.7H_2O$ either by heating under vacuum at a temperature between 150° C. and 450° C. (for example 200° C.), or by heating in an ionic liquid (for example 2 hours at 270° C. in EMI-TFSI).

The compounds (I) in which the $(Z_{1-b}Z'_b)$ group represents more than one element are preferably prepared by using, as a precursor of Z and Z', a solid solution of sulfate, preferably in hydrate form.

In one particular embodiment, a process that aims to prepare an $Fe_{1-b}Z'_bSO_4.H_2O$ precursor comprises the following steps:
  dissolving 1-b moles of $FeSO_4.nH_2O$ and b moles of $Z'SO_4.nH_2O$ in water previously degassed by argon or nitrogen to avoid the oxidation of Fe(II), $b \leq 0.25$ and $n \leq 7$;
  adding an alcohol (for example ethanol or isopropanol) to give rise to the precipitation of $Fe_{1-b}Z'_bSO_4.nH_2O$;
  recovering (for example by centrifuging) the powder which is formed; and
  washing with alcohol, then heating at a temperature between 150 and 250° C. (for example at 200° C.) under vacuum for 1 hour.

The preparation of a precursor in which Z represents Fe and Co or Fe and Ni may be carried out in the same manner by choosing $CoSO_4.nH_2O$ or $NiSO_4.nH_2O$ for $Z'SO_4.nH_2O$, b then being less than 1.

A compound of the invention may be obtained by a synthesis process at temperatures of less than 330° C. via an ionothermal route.

The process via the ionothermal route comprises the following steps:

i) dispersing said precursors in a support liquid comprising at least one ionic liquid consisting of a cation and of an anion, the electric charges of which are balanced, in order to obtain a suspension of said precursors in said liquid;

ii) heating said suspension to a temperature of 25 to 330° C.;

iii) separating said ionic liquid and the inorganic oxide of formula (I) resulting from the reaction between said precursors.

The sulfate monohydrate precursor may be prepared previously, or prepared in situ in the ionic liquid, during a preliminary step.

The expression "ionic liquid" is understood to mean a compound that contains only anions and cations, the charges of which are balanced, and which is liquid at the temperature of the reaction for formation of the compounds of the invention, either pure, or as a mixture with an additive.

The amount of precursors present within the ionic liquid during step i) is preferably from 0.01% to 85% by weight, and more preferably from 5 to 60% by weight.

The respective amounts of the various precursors depend on the stoichiometry of the compound (I) to be prepared. Their determination is within the scope of the person skilled in the art, since the reactions are stoichiometric. Preferably, an excess of fluoride, preferably of the order of 5 to 25%, is used.

According to one preferred embodiment of the invention, the cation of ionic liquid is chosen from the cations of the following formulae:

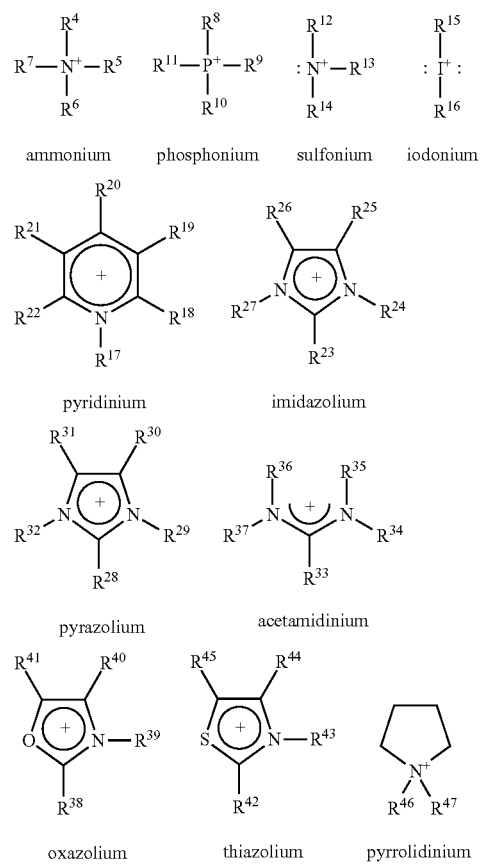

-continued

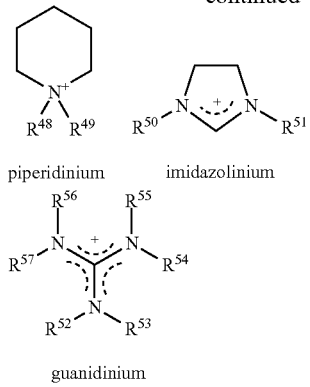

piperidinium    imidazolinium guanidinium in which:
the $R^4$-$R^7$, $R^{17}$, $R^{27}$, $R^{24}$, $R^{28}$, $R^{29}$, $R^{37}$, $R^{34}$, $R^{39}$, $R^{43}$ and $R^{46}$ to $R^{57}$ radicals, independently of one another, represent a $C_1$-$C_{24}$ alkyl, $C_1$-$C_{24}$ arylalkyl or $(C_1$-$C_{24})$alkylaryl radical;
the $R^8$—$R^{16}$ radicals have the meaning given for $R^4$ or they each represent a $(C_1$-$C_{20})$alkylaryl radical or an $NR^{63}R^{64}$ group;
the $R^{18}$ to $R^{22}$, $R^{23}$, $R^{25}$, $R^{26}$, $R^{30}$ to $R^{33}$, $R^{35}$, $R^{36}$, $R^{38}$, $R^{40}$ to $R^{42}$, $R^{44}$ and $R^{45}$ radicals represent a hydrogen atom, a $C_1$-$C_{24}$ alkyl, an or $C_1$-$C_{24}$ oxaalkyl radical or a —[(CH)$_2$]$_n$Q radical in which Q represents —OH, —CN, —C(=O)OR$^{58}$, —C(=O)NR$^{59}$R$^{60}$, —NR$^{61}$R$^{62}$, —CH(OH)CH$_2$OH, or else a 1-imidazoyl, 3-imidazoyl or 4-imidazoyl radical, and $0 \leq n \leq 12$; and
$R^{58}$ to $R^{64}$, independently of one another, represent a hydrogen atom, a $C_1$-$C_{20}$ alkyl, aryl or $C_1$-$C_{20}$ oxaalkyl radical.

Very particularly preferred are the imidazolium cations in which $R^{23}$=H or CH$_3$, $R^{24}$=CH$_3$, $R^{25}$=$R^{26}$=H, and $R^{27}$=C$_2$H$_5$, C$_3$H$_7$, C$_4$H$_9$, C$_5$H$_{11}$, C$_6$H$_{13}$, C$_8$H$_{17}$, (CH$_2$)$_3$OH, (CH$_2$)$_3$CN, (CH$_2$)$_4$OH, or (CH$_2$)$_4$CN, and the imidazolium cations in which $R^{23}$=H or CH$_3$, $R^{24}$=C$_4$H$_9$, $R^{25}$=$R^{26}$=H, $R^{27}$=(CH$_2$)$_2$OH, (CH$_2$)$_2$CN, (CH$_2$)$_3$OH, (CH$_2$)$_3$CN, (CH$_2$)$_4$OH, (CH$_2$)$_4$CN, or CH$_2$CH(OH)CH$_2$OH.

The anion of an ionic liquid is preferably chosen from Cl, Br, I, RSO$_3^-$, ROSO$_3^-$, [RPO$_2$]$^-$, [R(R'O)PO$_2$]$^-$, [(RO)$_2$PO$_2$]$^-$, BF$_4^-$, R$_f$BF$_3^-$, PF$_6^-$, R$_f$PF$_5^-$, (R$_f$)$_2$PF$_4^-$, (R$_f$)$_3$PF$_3^-$, R$_f$CO$_2^-$, R$_f$SO$_3^-$, [(R$_f$SO$_2$)$_2$N]$^-$, [(R$_f$SO$_2$)$_2$CH]$^-$, [(R$_f$SO$_2$)$_2$C(CN)]$^-$, [R$_f$SO$_2$C(CN)$_2$]$^-$, [(R$_f$SO$_2$)$_3$C]$^-$, N(CN)$_2^-$, C(CN)$_3^-$, [(C$_2$O$_4$)$_2$B]$^-$ in which:
R and R', which are identical or different, each represent a $C_1$-$C_{24}$ alkyl, aryl or $(C_1$-$C_{24}$)alkylaryl radical; and
R$_f$ is a fluoro radical chosen from C$_n$F$_{2n+1}$ in which $0 \leq n \leq 8$, CF$_3$OCF$_2$, HCF$_2$CF$_2$ and C$_6$F$_5$.

When the cation of the ionic liquid is an imidazolium cation, it is desirable for the C2 carbon of the imidazolium cation to be protected by an alkyl group, preferably having 1 to 4 carbon atoms, due to the fact that the precursor of the A element is a fluoride. Otherwise, the acid proton borne by the C2 carbon would give rise to the decomposition of the cation of the ionic liquid.

An ionic liquid having a high hydrophobic character favors the reaction between the precursor of A (AF) and the hydrated ZSO$_4$ precursor. It makes it possible to carry out the synthesis in an open reactor. A hydrophilic ionic liquid is less favorable, and it necessitates carrying out the synthesis in a sealed reactor under pressure.

1-Butyl-3-methylimidazolium trifluoromethanesulfonate (BMI-triflate), and 1-ethyl-3-methylimidazolium bis(trifluoromethanesulfonyl)imide (EMI-TFSI) are particularly preferred. EMI-TFSI, which is more hydrophobic than BMI-triflate, is particularly preferred.

According to one preferred embodiment of the invention, the temperature for heating the suspension during step ii) is between 100° C. and 330° C., and more preferably still between 150 and 280° C.

The heating step ii) is preferably carried out under an inert atmosphere, at atmospheric pressure. Indeed, one of the main advantages of the process in accordance with the invention is to not require a pressurized chamber due to the lack of volatility of the ionic liquid(s).

The heating may be carried out by various means, in particular by heating in an oven, or by microwave heating. It may be carried out continuously, in a heated chamber in which the ionic liquid and the precursors of the compound (I) flow, with a residence time that enables the reaction to be complete.

The duration of the heating step ii) generally varies from 10 minutes to 200 hours, preferably from 3 to 48 hours.

The separation of compound (I) during step iii) may be carried out by any technique known to a person skilled in the art such as, for example, by extraction with a solvent of the ionic liquid or by centrifugation, and removal of the possible by-products via an alcohol, a nitrile, a ketone or a chloroalkane having 1 to 6 carbon atoms.

At the end of the synthesis, the compound (I) may be washed, with an organic solvent such as, for example, acetone, acetonitrile or ethyl acetate, then used without further purification.

Likewise at the end of the synthesis, the ionic liquid may be recovered, optionally diluted by dichloromethane, chloroform, dichloroethane, methyl ethyl ketone, a pentanone, esters including ethyl acetate and ethyl formate, and washed, preferably with water and/or an acid solution such as, for example, an aqueous solution of hydrochloric acid, of sulfuric acid or sulfamic acid. After washing and drying (for example using Rotavapor®) or under primary vacuum, the ionic liquid may thus be used for a new synthesis, which is very advantageous from an economical viewpoint.

The process for preparing a material (I) via a ceramic route uses the same precursors as the process by the ionothermal route. It consists in bringing powders of precursors into contact and in subjecting the mixture to a heat treatment. It is characterized in that:
the SO$_4$, Z and, where appropriate, Z' elements are provided by a single precursor in the form of a hydrated sulfate;
the F, A and, where appropriate A' elements are each provided by a fluoride;
the heat treatment is carried out in a sealed reactor.

The sulfate hydrate is preferably in $(Z_{1-b}Z'_b)SO_4 \cdot H_2O$ precursor monohydrate form.

The precursors are used in stoichiometric amounts, or with an excess of fluoride preferably of the order of 5 to 25%.

The mixture of powder is preferably pelleted via compression before being introduced into the reactor.

The heat treatment is carried out under temperature and pressure conditions that depend on the volume of the reactor (made of steel or made of quartz for example) and on the amount of precursors introduced into the reactor. The proportion of tavorite phase and of parasitic phases depends on the "mass of precursors treated/volume of the sealed reactor" ratio. It is noted that a higher confinement favors the production of a single tavorite phase. The determination of the conditions suitable for each particular case is within the scope of the person skilled in the art.

A material (I) according to the invention in which x=0, for example the compound FeSO$_4$F, may be obtained by electrochemical oxidation or by chemical oxidation of LiFeSO$_4$F in the presence of NO$_2$BF$_4$ or (CF$_3$CO$_2$)$_2$ICC$_6$H$_5$. It has a triclinic structure, space group P−1 with the following lattice parameters a=5.0683(7) (Å), b=5.0649(19) (Å), c=7.2552 (19) (Å), α=69.36(3), β=68.80(3), γ=88.16(2), and V=161.52 (8) (Å$^3$).

A compound (I) may be used in various applications as a function of the elements that form it. By way of example, the compounds (I) of the invention may be used as active material for the manufacture of electrodes in batteries and electrochromic systems, as ceramics, as magnetic materials for storing information, as pigment, or in a photovoltaic cell as a light-absorbing material with a better result than that obtained with the aid of conventionally used TiO$_2$.

When a compound according to the invention is used as an electrode material, the electrode may be prepared by depositing onto a current collector a composite material obtained by mixing, via manual milling or via mechanical milling (for example via milling for around 10 minutes using an SPEX 1800 mill), a mixture comprising a compound of the invention and carbon. The percentage by weight of compound (I) relative to the "compound (I)+carbon" composite material may be from 50 to 99%, more particularly from 80 to 95%.

The composite material used for producing an electrode may also contain an additional compound, the compound (I)/additional compound weight ratio being greater than 5%. The additional compound may be, for example, a material with an olivine structure such as an LiMPO$_4$ material in which M represents at least one of the elements Fe, Co and Ni, or an oxide LiCoO$_2$ or LiNiO$_2$.

The amount of material deposited on the current collector is preferably such that the amount of compound according to the invention is between 0.1 and 200, preferably from 1 to 50 mg per cm$^2$. The current collector may consist of a grid or sheet of aluminum, of titanium, of graphite paper or of stainless steel.

An electrode according to the invention may be used in an electrochemical cell comprising a positive electrode and a negative electrode separated by an electrolyte. The electrode according to the invention forms the positive electrode.

The negative electrode may consist of metallic lithium or of one of its alloys, or of a transition metal oxide that forms, via reduction, a nanoscale dispersion in lithium oxide, or of a double nitride of lithium and of a transition metal. The negative electrode may also consist of a material capable of reversibly inserting Li$^+$ ions at potentials of less than 1.6 V. As examples of such materials, mention may be made of low-potential oxides that have the general formula Li$_{1+y+x/3}$Ti$_{2-x/3}$O$_4$ (0≤x≤1, 0≤y≤1), Li$_{4+x'}$Ti$_5$O$_{12}$0≤x'≤3, carbon and carbon-based products resulting from the pyrolysis of organic materials, and also dicarboxylates.

The electrolyte advantageously comprises at least one lithium or sodium salt in solution in a polar aprotic liquid solvent, in a solvating polymer optionally plasticized by a liquid solvent or an ionic liquid, or in a gel consisting of a liquid solvent gelled by addition of a solvating or non-solvating polymer.

The present invention is illustrated by the following exemplary embodiments, to which it is not however limited.

Unless otherwise mentioned, FeSO$_4$.H$_2$O was prepared from FeSO$_4$.7H$_2$O by heating under vacuum at 200° C., or by heating FeSO$_4$.7H$_2$O in the EMI-TFSI ionic liquid at 250° C. for 2 hours.

EXAMPLE 1

In a preliminary step, FeSO$_4$.7H$_2$O was subjected to a heat treatment in EMI-TFSI at 250° C. for 10 h, then at 280° C. for 24 h. The FeSO$_4$.H$_2$O monohydrate formed is recovered by centrifugation, washed with ethyl acetate, then dried under vacuum at 100° C.

In a mortar, 0.85 g of FeSO$_4$.H$_2$O thus obtained and 0.148 g of LiF (1/1.14 molar ratio) were mixed, and the mixture was introduced into a Parr® bomb calorimeter and 5 ml of ethyl-methylimidazolium bis(trifluoromethanesulfonyl)imide (EMI-TFSI) were added. The mixture was stirred for 20 min at room temperature, left to settle for 2 h, then heated at 300° C. for two hours, in the open bomb calorimeter, without stirring.

After cooling the reaction mixture to room temperature, the powder obtained was separated by centrifugation, washed 3 times with 20 ml of dichloromethane, then dried in an oven at 60° C.

The product obtained is in the form of a pale green-colored powder. It was subjected to various analyses.

SEM Analyses

Figure 1:
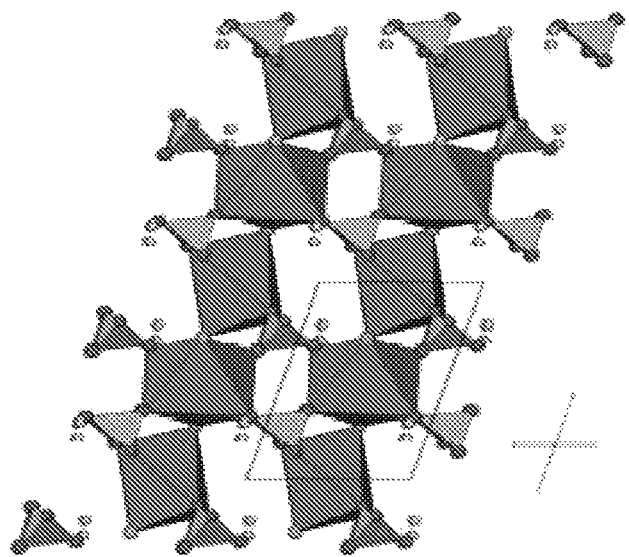
FIGS. 1 and 2 are schematic representations respectively of the distorted tavorite-type structure having a triclinic lattice and having a monoclinic lattice.
Figure 2:
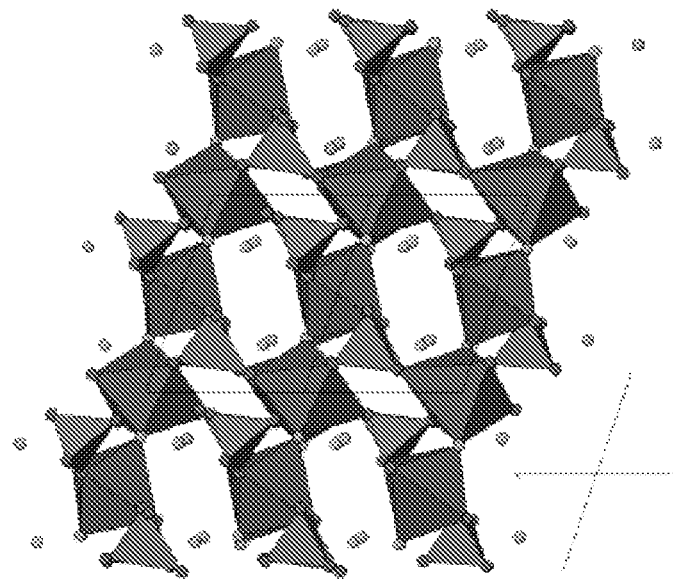
Figure 3:
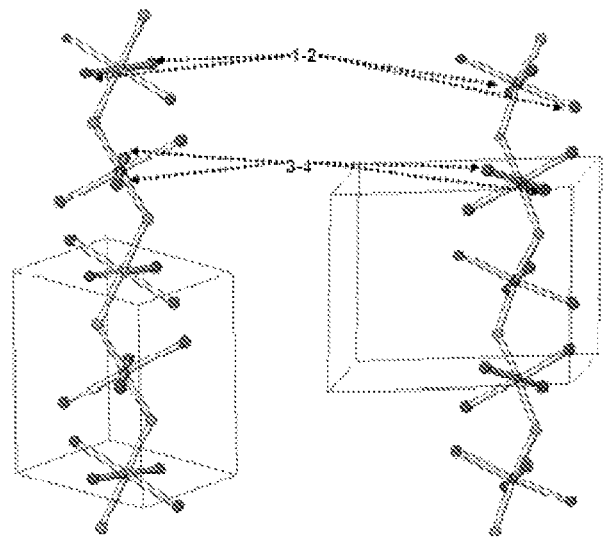
FIG. 3 is a comparative view of the triclinic lattice on the left and the monoclinic lattice on the right.
Figure 4:
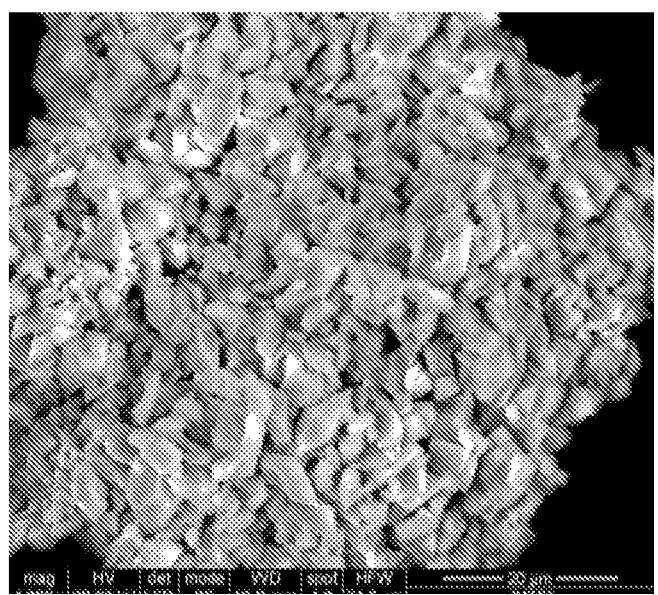
FIG. 4 represents the image obtained by SEM for the LiFeSO$_4$F material from example 1.

FIG. 4 represents the image obtained by SEM and shows that the powder is in the form of agglomerates consisting of micron-sized particles.

TEM Analysis

Figure 5A:
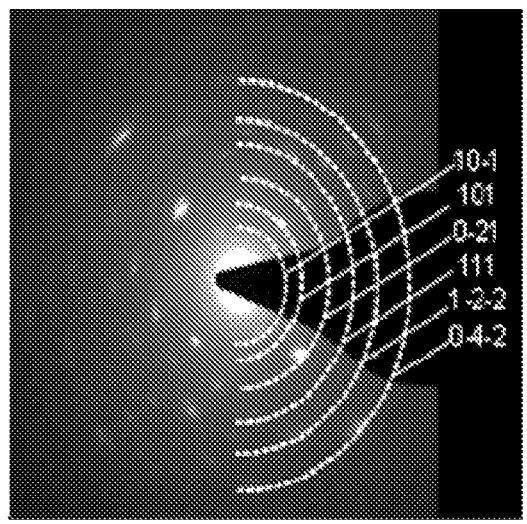
FIG. 5a represents the TEM image, more particularly the corresponding SAED diagram, for the LiFeSO$_4$F material from example 1
Figure 5B:
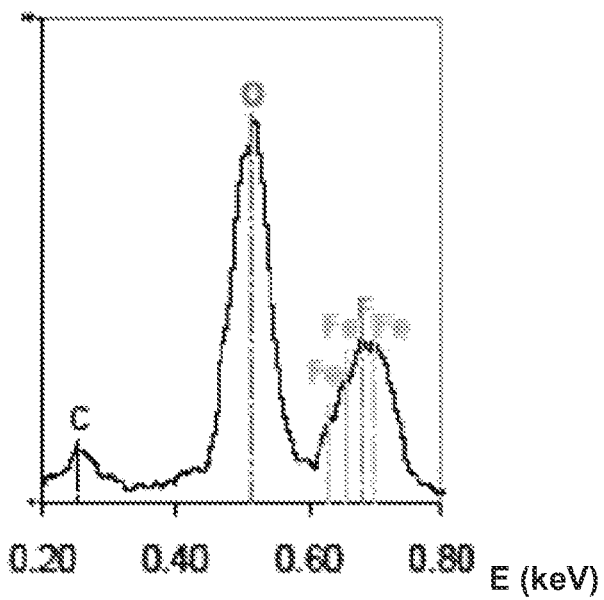
FIG. 5b represents the EDS spectrum which shows the presence of F. The intensity is given on the y-axis (in arbitrary units) as a function of the energy E (in keV) on the x-axis.

FIG. 5a represents the TEM image, more particularly the corresponding SAED diagram, and it shows that the particles consist of numerous crystallites. FIG. 5b represents the EDS spectrum which shows the presence of F. The intensity is given on the y-axis (in arbitrary units) as a function of the energy E (in keV) on the x-axis.

X-Ray Diffraction

Figure 6:
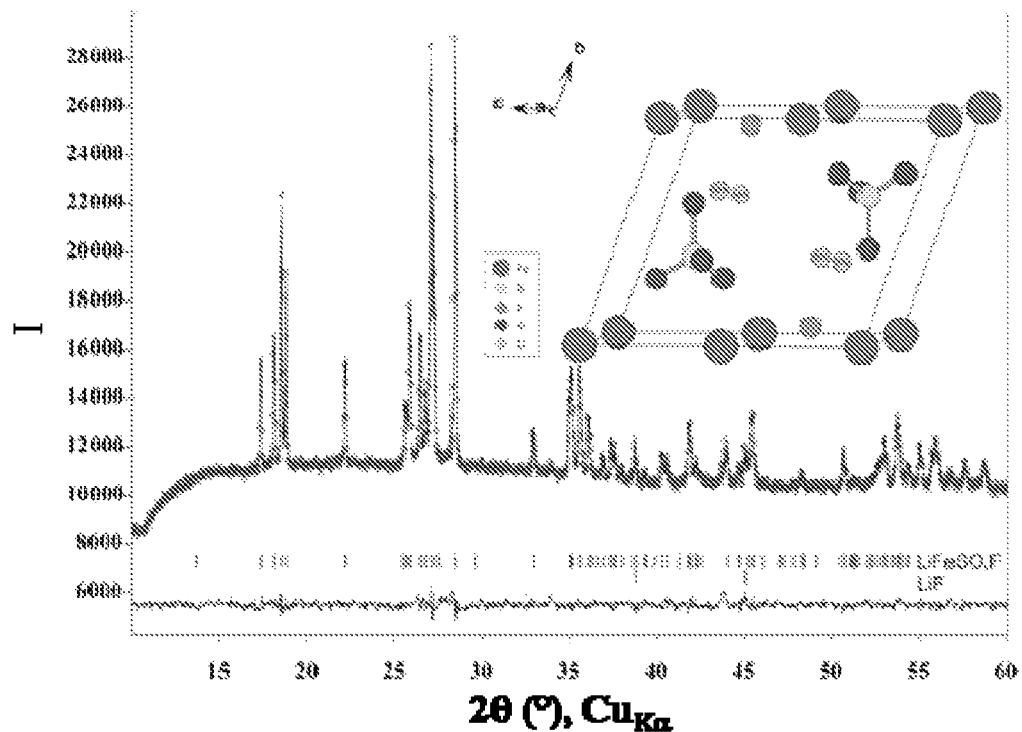
FIG. 6 represents the X-ray diffraction diagram and, in the form of an insert, the structure of the LiFeSO$_4$F material from example 1.

FIG. 6 represents the X-ray diffraction diagram and, in the form of an insert, the structure of the compound obtained. This structure comprises independent FeO$_4$F$_2$ octahedra (denoted by "2"), SO$_4$ tetrahedra (denoted by "1") with tunnels in which the Li$^+$ ions (denoted by "3") are found.

Thermogravimetric Analysis (TGA)

Figure 7:
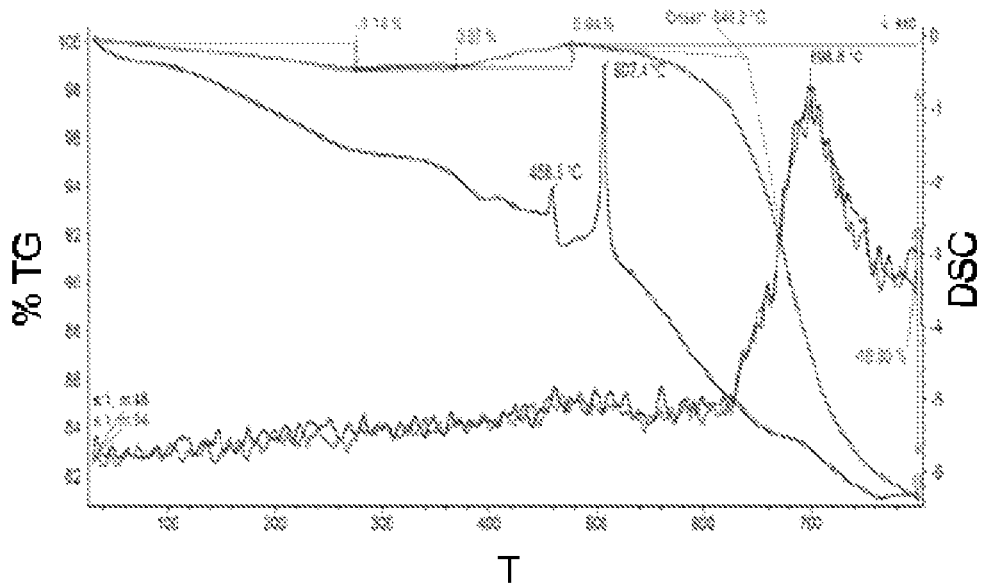
FIG. 7 represents the diagram obtained during the characterization by TGA coupled with a mass spectrometry of the LiFeSO$_4$F material from example 1.

FIG. 7 represents the diagram obtained during the characterization of the compound by TGA coupled with mass spectrometry. The upper curve (which is labeled with −1.14%, 0.07%, etc.) corresponds to the TGA analysis, the middle curve (which is labeled with 458.5° C. and 507.4° C.) corresponds to the differential scanning calorimetry (DSC) and the lower curve (labeled with m48 and m64) corresponds to the mass spectrometry. These curves show that a weight loss of 23.41% occurs between 400° C. and 700° C., corresponding to a departure of SO$_2$ which, under the electron impact in the mass spectrometers, partially fragments to SO. The irregularities in the TGA and DSC curve for is temperatures above 350° C. indicate the beginning of thermal instability of the compound.

The DSC and TGA analyses thus show that it is not possible to obtain LiFeSO$_4$F by a process via a ceramic route carried out at temperatures above 400° C. as described in US-2005/0163699.

Figure 8:
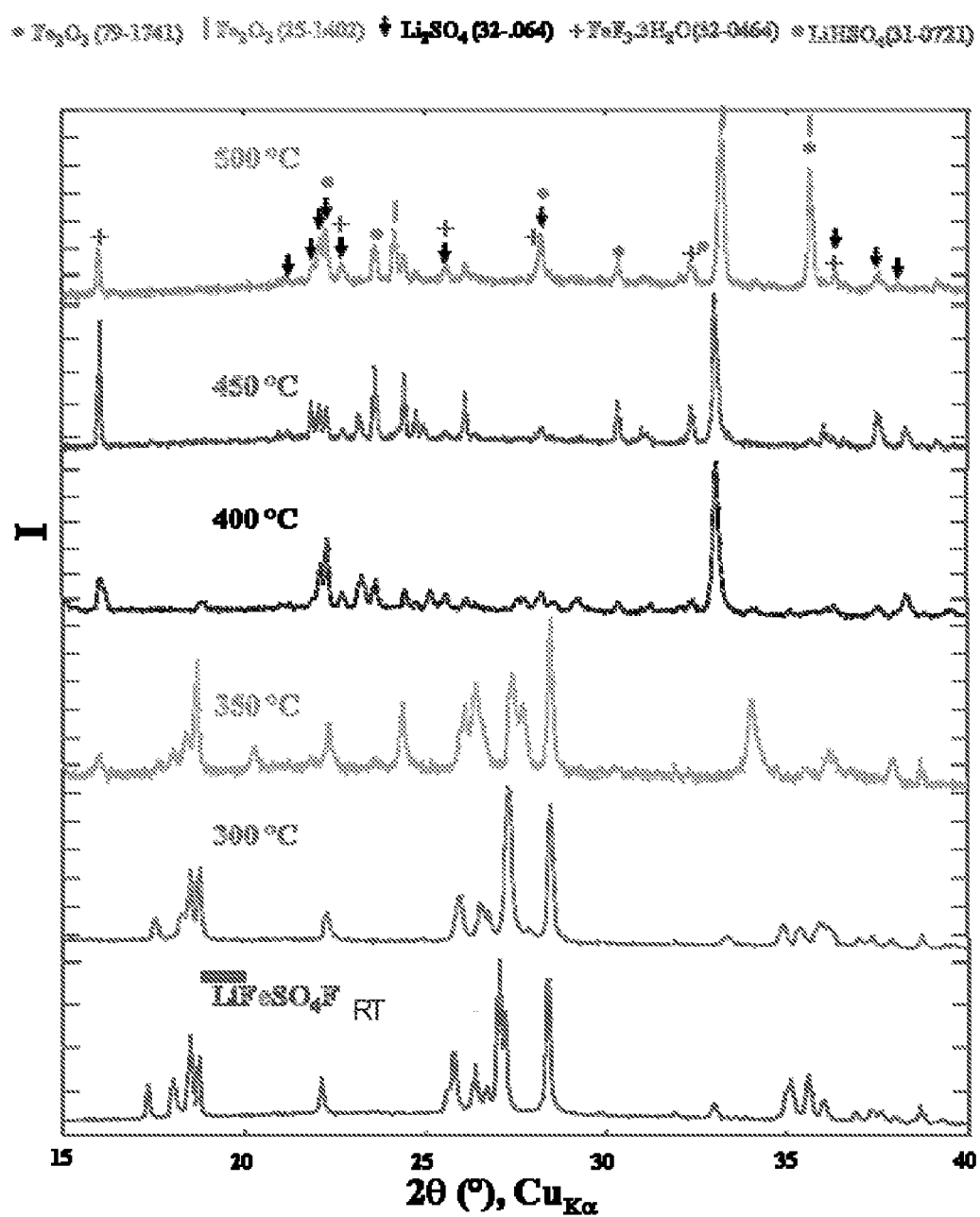
FIG. 8 represents the change in the X-ray diffraction diagram during the increase in the temperature, for a sample of LiFeSO$_4$F.

To confirm this fact, a sample of the product obtained in the present example was heated in air for 30 minutes as in US-2005/0163699. FIG. 8 represents the change in the X-ray diffraction diagram during the increase in the temperature. RT denotes room temperature. The lines visible at 500° C. are attributed to the compounds that exist at this temperature, with reference to the numbers of the JCPDS files corresponding to the materials identified as follows:

* Fe$_2$O$_3$ (79-1741)

| Fe$_2$O$_3$ (25-1402)

✦ $Li_2SO_4$ (32-064)+$FeF_3.3H_2O$ (32-0464)
● $LiHSO_4$ (31-0721)

COMPARATIVE EXAMPLE 1

An equimolar mixture of anhydrous $FeSO_4$ and of LiF was prepared, and it was heated in air at 450° C. for 15 minutes.

Figure 9:
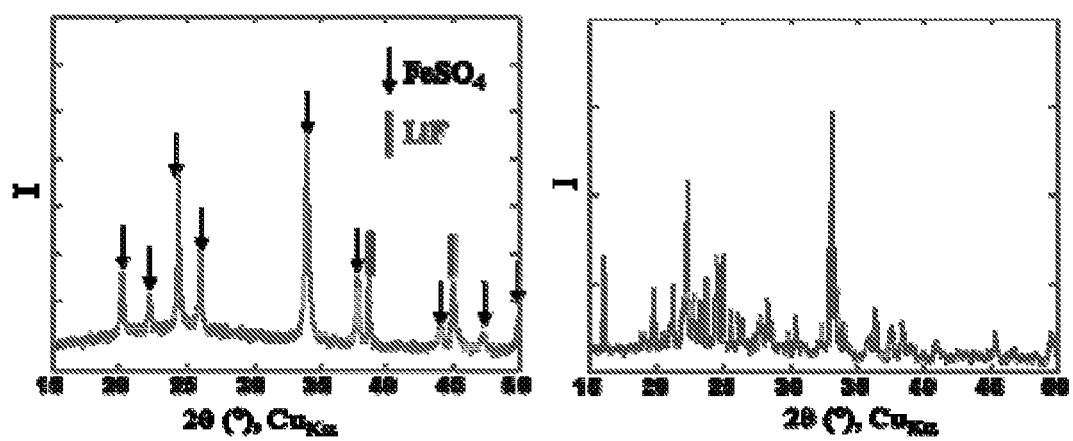
FIG. 9 represents the X-ray diffraction diagram for the FeSO$_4$+LiF mixture FIG. 9a) and for the material obtained after the heat treatment (FIG. 9b).
Figure 10:
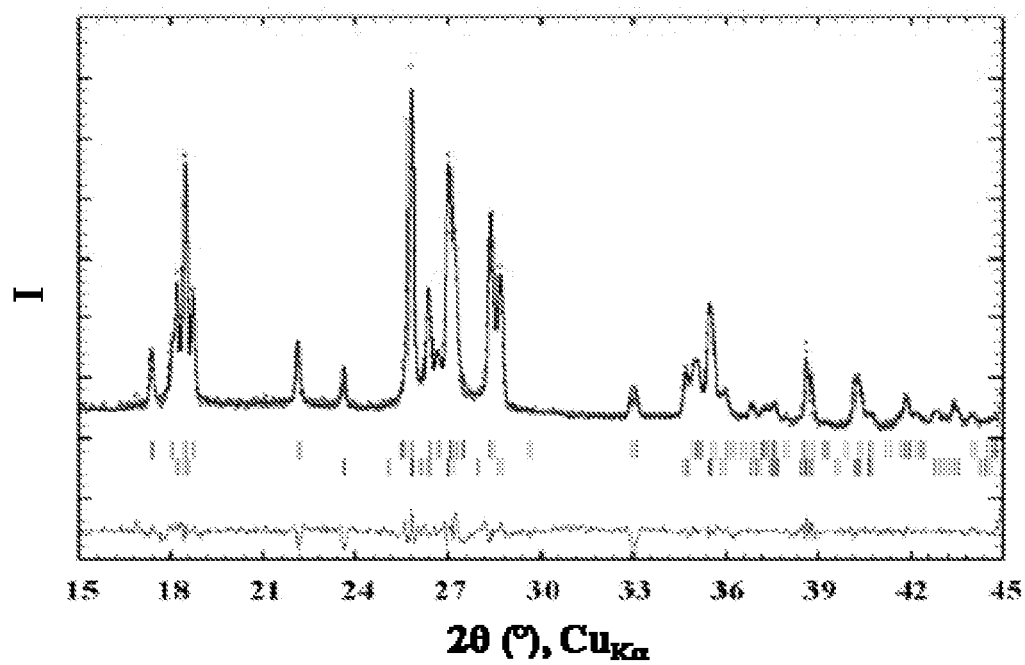
Figure 11:
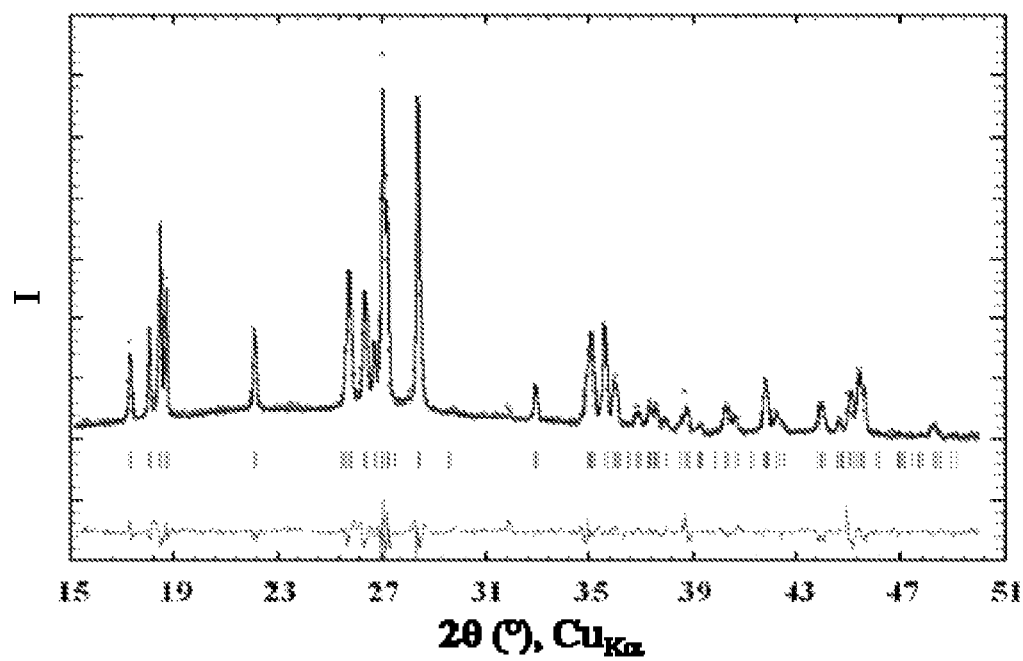
Figure 12:
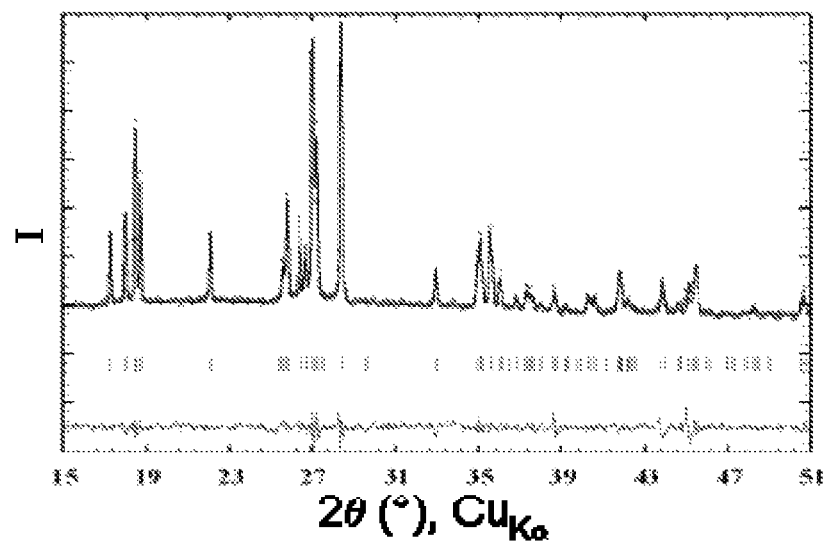
Figure 13:
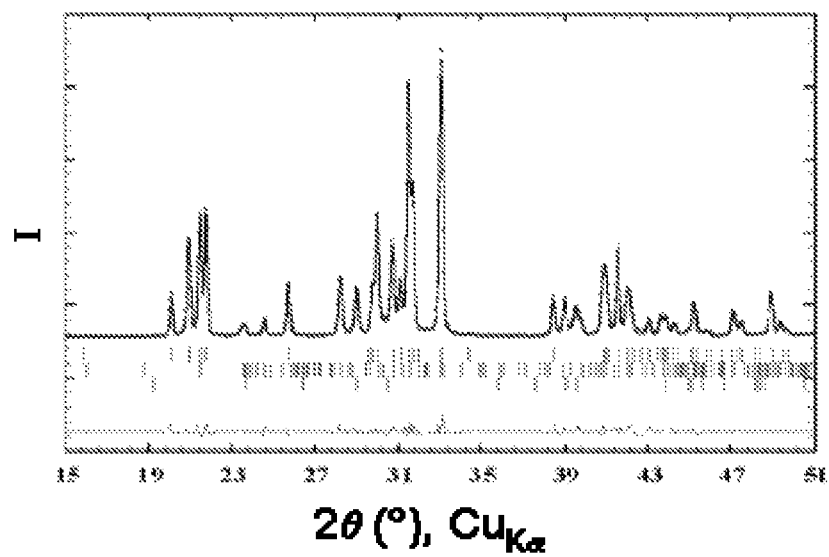

FIG. 9 represents the X-ray diffraction diagram for the mixture of starting reactants (FIG. 9a) and for the product obtained after the heat treatment at 450° C. for 15 min (FIG. 9b). The peaks that correspondent respectively to $FeSO_4$ and to LiF are visible in FIG. 9a, whereas FIG. 9b shows peaks corresponding respectively to LiF, $Li_2SO_4$, $Fe_2O_3$ and $Li_2S_2O_7$.

This example confirms that the treatment, via a ceramic route, of a mixture of precursor of Fe and of S, and of a precursor of F does not give the compound $LiFeSO_4F$ under the conditions described in US-2005/0163699.

EXAMPLE 2

Synthesis of $LiFeSO_4F$ from $FeSO_4.7H_2O$ and LiF in EMI-TFSI

Introduced into a PTFE flask containing 3 ml of 1-ethyl-3-methylimidazolium bis(trifluoromethanesulfonyl)imide (EMI-TFSI) was a mixture of 1.404 g of $FeSO_4.7H_2O$ and 0.149 g of LiF prepared in a mortar, the mixture was subjected to magnetic stirring for 20 minutes at room temperature, the stirring was stopped, then 2 ml of ionic liquid (EMI-TFSI) were added, and the mixture was kept without stirring at room temperature for 30 minutes. The whole assembly was then introduced into an oven at 200° C., the temperature of the oven was increased, by 10° C. every 20 minutes up to 275° C., kept at this value for 12 hours, then left to cool slowly.

The powder that was formed during the heat treatment was separated from the ionic liquid by centrifugation, washed 3 times with 10 ml of dichloromethane, then dried in an oven at 60° C.

The refinement of the X-ray diffraction spectrum carried out with a copper cathode (represented in FIG. 10) shows the presence of two phases, $LiFeSO_4F$ and $FeSO_4.H_2O$, in equivalent proportions.
Phase 1: $LiFeSO_4F$
Triclinic, space group: P–1 (2)
A=5.1819(5) Å, b=5.4853(4) Å, c=7.2297(4) Å,
α=106.4564(3)°, β=107.134(6)°, γ97.922(5)°
V=182.761(4) Å$^3$.
Phase 2: $FeSO_4.H_2O$
Triclinic, space group: P–1 (2)
A=5.178(7) Å, b=5.176(7) Å, c=7.599(7) Å;
α=107.58(6)°, β=107.58(8)°, γ=93.34(6)°
V=182.56(4) Å$^3$.

EXAMPLE 3

Synthesis of $LiFeSO_4F$ from $FeSO_4.7H_2O$ and LiF in EMI-TFSI

Introduced into a PTFE flask containing 3 ml of 1-ethyl-3-methylimidazolium bis(trifluoromethanesulfonyl)imide (EMI-TFSI) was a mixture of 0.85 g of $FeSO_4.H_2O$ and 0.149 g of LiF (1/1.14 molar ratio) prepared in a mortar, the mixture was subjected to magnetic stirring for 20 minutes at room temperature, the stirring was stopped, then 2 ml of ionic liquid (EMI-TFSI) were added, and the mixture was kept without stirring at room temperature for 30 minutes. The whole assembly was then introduced into an oven at 200° C., the temperature of the oven was increased by 10° C. every 20 minutes up to 275° C., kept at this value for 12 hours, then left to cool slowly.

The powder that was formed during the heat treatment was separated from the ionic liquid by centrifugation, washed 3 times with 10 ml of dichloromethane, then dried in an oven at 60° C.

The refinement of the X-ray diffraction spectrum carried out with a copper cathode (represented in FIG. 11) shows the presence of a single, $LiFeSO_4F$ phase, the lattice parameters of which are as follows:
Triclinic, space group: P–1 (2)
a=5.1827(7) Å, b=5.4916(6) Å, c=7.2285(7) Å,
α=106.535(7)°, β=107.187(6)°, γ97.876(5)°
V=182.95(4) Å$^3$.

The comparison of examples 2 and 3 shows that the use of a sulfate monohydrate is more favorable than the use of a sulfate heptahydrate, insofar as the first mentioned makes it possible to obtain a single phase, whereas the second gives a mixture.

EXAMPLE 4

Synthesis of $LiFeSO_4F$ from $FeSO_4.H_2O$ and LiF

The synthesis of $LiFeSO_4F$ is carried out via an ionothermal route in an autoclave at 280° C.

Introduced into an autoclave containing 3 ml of 1-ethyl-3-methylimidazolium bis(trifluoromethanesulfonyl)imide (EMI-TFSI) was a mixture of 0.85 g of $FeSO_4.H_2O$ and 0.149 g of LiF (1/1.14 molar ratio) prepared in a mortar, the mixture was subjected to magnetic stirring for 30 minutes at room temperature, the stirring was stopped, then 2 ml of ionic liquid (EMI-TFSI) were added, and the mixture was kept without stirring at room temperature for 30 minutes. After sealing the autoclave under argon, the whole assembly was then introduced into an oven at 200° C., the temperature of the oven was increased by 10° C. every 20 minutes up to 280° C. kept at this value for 48 hours, then left to cool slowly.

The powder that was formed during the heat treatment was separated from the ionic liquid by centrifugation, washed 3 times with 10 ml of dichloromethane, then dried in an oven at 60° C.

The product obtained is in the form of a whitish powder. The slightly different color from that of the sample from example 1 denotes an aptitude for the non-stoichiometry of the phases, according to the operating conditions.

The refinement of the X-ray diffraction spectrum carried out with a copper cathode (represented in FIG. 12) shows the presence of a single, $LiFeSO_4F$ phase, the lattice parameters of which are as follows:
Triclinic, space group: P–1 (2)
a=5.1782(4) Å, b=5.4972(4) Å, c=7.2252(4) Å,
α=106.537(4)°, β=107.221(4)°, γ=97.788(3)°
V=182.82(4) Å$^3$.

EXAMPLE 5

Synthesis of $LiFeSO_4F$ from $FeSO_4.H_2O$ and LiF in 1-butyl-3-methylimidazolium trifluoromethanesulfonate (triflate)

The synthesis of $LiFeSO_4F$ is carried out via an ionothermal route in an autoclave at 270° C.

Introduced into an autoclave containing 3 ml of 1-butyl-3-methylimidazolium trifluoromethanesulfonate (triflate) was a mixture of 0.85 g of $FeSO_4.H_2O$ and 0.149 g of LiF (1/1.14 molar ratio) prepared in a mortar, the mixture was subjected to magnetic stirring for 30 minutes at room temperature, the stirring was stopped, then 2 ml of ionic liquid (EMI-Tf) were added, and the mixture was kept without stirring at room temperature for 30 minutes. After sealing the autoclave under argon, the whole assembly was then introduced into an oven at 200° C., the temperature of the oven was increased, by 10° C. every 20 minutes up to 270° C., kept at this value for 48 hours, then left to cool slowly.

The powder that was formed during the heat treatment was separated from the ionic liquid by centrifugation, washed 3 times with 10 ml of dichloromethane, then dried in an oven at 60° C.

The refinement of the X-ray diffraction spectrum carried out with a cobalt cathode (represented in FIG. 13) shows the presence of an $LiFeSO_4F$ phase (representing around 50% by weight), and two "anhydrous $FeSO_4$" phases.
Phase 1: $LiFeSO_4F$, Triclinic, space group P−1 (2)
Phase 2: orthorhombic, space group Cmcm (63)
Phase 3: orthorhombic, space group Pbnm (62)

The comparison of examples 4 and 5 shows that the use of a hydrophobic ionic liquid is more favorable than the use of a hydrophilic ionic liquid, insofar as the first mentioned makes it possible to obtain a single phase, whereas the second gives a mixture.

EXAMPLE 6

Synthesis of $LiCoSO_4F$ from $CoSO_4.H_2O$ and LiF in EMI-TFSI

The $CoSO_4.H_2O$ precursor used was prepared from $CoSO_4.H_2O$ by heating under vacuum at 160° C. for 2 hours.

Introduced into a PTFE flask containing 5 ml of 1-ethyl-3-methylimidazolium bis(trifluoromethanesulfonyl)imide (EMI-TFSI) was a mixture of 0.86 g of $CoSO_4.H_2O$ and 0.149 g of LiF (1/1.13 molar ratio) prepared in a mortar, the mixture was subjected to magnetic stirring for 20 minutes at room temperature and the stirring was stopped. The flask was then sealed under argon, and the reaction mixture was kept without stirring at room temperature for 30 minutes. The whole assembly was then introduced into an oven at 250° C., the temperature of the oven was increased by 5° C. every 10 minutes up to 275° C., kept at this value for 36 hours, then left to cool slowly.

The powder that was formed during the heat treatment was separated from the ionic liquid by centrifugation, washed 3 times with 10 ml of ethyl acetate, then dried in an oven at 60° C.

The refinement of the X-ray diffraction spectrum carried out with a cobalt cathode (represented in FIG. 14) shows the presence of a single, $LiCoSO_4F$ phase, the lattice parameters of which are as follows:
a=5.1719(6) Å, b=5.4192(6) Å, c=7.1818(7) Å,
α=106.811(7)°, β=107.771(7)°, γ=97.975 (5)°
V=177.71(3) Å$^3$.

The curve obtained by thermogravimetric analysis is represented in FIG. 15. It shows a loss of weight starting from 400° C., prove that the compound $LiCoSO_4F$ is decomposed. It cannot therefore be obtained by a process in the solid phase using higher temperatures.

To confirm this fact, a sample of the product obtained in the present example was heated in air for 30 minutes as in US-2005/0163699. FIG. 16 represents the change in the X-ray diffraction diagram during the increase in the temperature. RT denotes room temperature. The arrows denote the zones in which the peaks corresponding to decomposition products are found. It thus appears that the compound begins to decompose at 375° C. The label "RT" given on the right of the lower curve signifies "room temperature".

EXAMPLE 7

Synthesis of $LiNiSO_4F$ from $NiSO_4.H_2O$ and LiF in EMI-TFSI

The $NiSO_4.H_2O$ monohydrate used as precursor was prepared from $NiSO_4.7H_2O$ by heating under vacuum at 240° C. for 2 hours.

Introduced into a PTFE flask containing 5 ml of 1-ethyl-3-methylimidazolium bis(trifluoromethanesulfonyl)imide (EMI-TFSI) was a mixture of 0.86 g of $NiSO_4.H_2O$ and 0.149 g of LiF (1/1.13 molar ratio) prepared in a mortar, the mixture was subjected to magnetic stirring for 20 minutes at room temperature and the stirring was stopped. The flask was then sealed under argon, and the reaction mixture was kept without stirring at room temperature for 30 minutes. The whole assembly was then introduced into an oven at 250° C., the temperature of the oven was increased up to 285° C. over 2 hours, kept at this value for 36 hours, then left to cool slowly.

The powder that was formed during the heat treatment was separated from the ionic liquid by centrifugation, washed 3 times with 10 ml of ethyl acetate, then dried in an oven at 60° C.

The X-ray diffraction diagram produced with a cobalt cathode (represented in FIG. 17) shows that the compound obtained contains more than 90.95% of a phase similar to that of $LiFeSO_4F$ or $LiCoSO_4F$. The lattice parameters of this phase are as follows:
Triclinic, space group: P−1 (2)
a=5.173(1) Å, b=5.4209(5) Å, c=7.183(1) Å,
α=106.828(9)°, β=107.776(8)°, γ=97.923 (8)°
V=177.85(5) Å$^3$.

The curve obtained by thermogravimetric analysis is represented in FIG. 18. It shows a loss of weight starting from 380° C., proof that the compound $LiNiSO_4F$ is decomposed. It cannot therefore be obtained by a process in the solid phase using higher temperatures.

To confirm this fact, a sample of the product obtained in the present example was heated in air for 30 minutes as in US-2005/0163699. FIG. 19 represents the change in the X-ray diffraction diagram during the increase in the temperature. The arrows denote the zones in which the peaks corresponding to decomposition products are found. It thus appears that the compound begins to decompose at 375° C. The label "RT" given on the right of the lower curve signifies "room temperature".

EXAMPLE 8

$LiFe_{1-y}Mn_ySO_4F$ Solid Solution

An $LiFe_{1-y}Mn_ySO_4F$ compound was prepared from LiF and from a $Fe_{1-y}Mn_ySO_4.H_2O$ solid solution as precursor.

Preparation of the Precursor 1-y mol of $FeSO_4.7H_2O$ and y mol of $MnSO_4.H_2O$ were dissolved in 2 ml of water previously degassed under argon to prevent the oxidation of Fe(II), then 20 ml of ethanol was added. The powder which formed by precipitation during the addition of ethanol was recovered by centrifugation, washed twice with 20 ml of ethanol, then heated at 200° C. under vacuum for 1 hour.

Several samples were prepared, varying the value of y.

The samples were analyzed by X-ray diffraction. The diffraction diagram of the "y=0.5" sample obtained, is represented in FIG. 20. It shows that it is the $Fe_{0.5}Mn_{0.5}SO_4.H_2O$ solid solution, the lattice parameters of which are as follows:
Triclinic, space group: P–1 (2)
a=5.2069 Å, b=5.2056 Å, c=7.6725 Å,
α=107.7196°, β=107.4498°, γ=93.08°
V=186.56 Å$^3$.

Preparation of the $LiFe_{1-y}Mn_ySO_4F$ Solid Solution

The synthesis is carried out via an ionothermal route in an autoclave at 270° C., for various precursor samples.

Introduced into an autoclave containing 3 ml of 1-ethyl-3-methylimidazolium bis(trifluoromethanesulfonyl)imide (EMI-TFSI) was a mixture of 0.85 g of $Fe_{0.5}Mn_{0.5}SO_4.H_2O$ and 0.149 g of LiF (1/1.14 molar ratio) prepared in a mortar, the mixture was subjected to magnetic stirring for 20 minutes at room temperature, the stirring was stopped, then 2 ml of ionic liquid (EMI-TFSI) were added, and the mixture was kept without stirring at room temperature for 30 minutes. After sealing the autoclave under argon, the whole assembly was then introduced into an oven at 200° C., the temperature of the oven was increased by 10° C. every 20 minutes up to 270° C., and kept at this value for 48 hours, then left to cool slowly.

The powder that was formed during the heat treatment was separated from the ionic liquid by centrifugation, washed 3 times with 10 ml of dichloromethane, then dried in an oven at 60° C.

The X-ray diffraction shows the formation of Li $Fe_{1-y}Mn_ySO_4F$ solid solution at low values of y (in particular for y<0.1) and the formation of mixed phases for the higher values of y (in particular for y>0.25).

EXAMPLE 9

Synthesis of $NaFeSO_4F$ from $FeSO_4.7H_2O$ and NaF

A mixture of 5 ml of EMI-TFSI and 2.808 g of $FeSO_4.7H_2O$ was introduced into an open Parr® bomb calorimeter, and heated at 230° C. After heating for 5 h, the mixture was cooled to room temperature, then 0.42 g of NaF was added before sealing the Parr® bomb calorimeter. After 10 minutes of magnetic stirring, the mixture was heated at 250° C. for 24 hours. After cooling to room temperature, the powder recovered was washed twice with 20 ml of acetone, then dried in an oven at 60° C. The X-ray diffraction diagram, represented in FIG. 21, shows the formation of a new phase having a monoclinic distorted tavorite-type structure having the space group $P2_{1/C}$.

In the examples, $FeO_4.H_2O$ and $CoSO_4.H_2O$ were prepared by heating $FeSO_4.7H_2O$ and $CoSO_4.7H_2O$ respectively and applying primary vacuum at 200° C. for 1 hour.

EXAMPLE 10

Synthesis of $LiFeSO_4F$

In a mortar, 0.850 g of $FeSO_4.H_2O$ monohydrate was mixed manually with 0.145 g of LiF, which corresponds to a 10% excess of LiF relative to the stoichiometric amounts. The powder was pelleted under a 10 tonne load, then the pellet was introduced into a Parr bomb calorimeter that was assembled in a dry box using argon as the carrier gas. The bomb calorimeter was then placed in an oven, the temperature of which was brought to 280° C. over 5 hours and maintained at this value for 60 hours. The oven was then rapidly cooled, the pellet was recovered and milled in order to characterize it via XRD.

The XRD diagram is represented in FIG. 22. It shows that the product obtained is a 95% single-phase product.

EXAMPLE 11

Synthesis of $LiFeSO_4F$ from $FeSO_4.H_2O$ and LiF at 280° C. (Effect of the Internal Pressure)

A mixture of $FeSO_4.H_2O$/LiF powders in a 1/1.14 molar ratio was prepared, and a pellet was prepared by compressing 1 g of powder mixture under a 10 tonne load. The pellet was introduced into a Parr bomb calorimeter that was assembled in a dry box using argon as the carrier gas. The Parr bomb calorimeter was then subjected to a heat treatment according to the following scheme: 1 h at 250° C., 1 h at 260° C., 1 h at 270° C., 60 h at 280° C., slow cooling. The oven was then rapidly cooled, the pellet was recovered and it was milled in order to characterize it by XRD (CuKα).

This procedure was carried out, on the one hand, in a Parr bomb calorimeter of 25 ml and, on the other hand, in a Parr bomb calorimeter of 50 ml.

The XRD diagrams are represented in FIG. 23. The upper curve corresponds to the implementation in the 25 ml Parr bomb calorimeter and the lower curve corresponds to the implementation in the 50 ml Parr bomb calorimeter. The diagrams show that the formation of the $LiFeSO_4F$ phase characteristic of the lines identified by the sign * and of impurities. The level of impurities is lowest in the 25 ml bomb calorimeter, namely around 5%.

EXAMPLE 12

Synthesis of $LiFeSO_4F$ Starting from $FeSO_4.H_2O$ and LiF at 290° C.

A mixture of 0.850 g of $FeSO_4H_2O$ and 0.2 g of LiF was prepared by mechanical milling for 10 min in an SPEX-800 mill, then the mixture was pelleted under a 10 tonne load and the pellet obtained was placed in a 25 ml Parr bomb calorimeter that was sealed under argon. The following heat treatment was then applied: 1 h at 250° C., 1 h at 260° C., 1 h at 270° C., 48 h at 290° C., slow cooling. The oven was then rapidly cooled, the pellet was recovered and it was milled in order to characterize it by XRD (CuKα). FIG. 24 represents the XR diffraction diagram (left-hand section) and a scanning electron microscopy photo (right-hand section). The XRD diagram shows the formation of a pure $LiFeSO_4F$ phase, crystallized in a triclinic lattice, of space group $P^{-1}$, with the following lattice parameters: a=5.1865(11) (Å), b=5.4863(9) (Å), c=7.2326(12) (Å), α=106.49(1), β=107.153(9), γ=97.888 (8), and a volume V=182.99(6) Å$^3$. The scanning electron microscopy photo shows agglomerates of small nanoscale particles that are very varied in size (400 nm to 800 nm).

EXAMPLE 13

Synthesis of $NaFeSO_4F$

In a mortar, 0.850 mg of $FeSO_4.H_2O$ monohydrate was mixed manually with 24545 mg of NaF, which corresponds to a 10% excess of NaF relative to the stoichiometric amounts. The powder was pelleted under a pressure of 10 000 psi, then the pellet was introduced into a Parr bomb calorimeter that was assembled in a dry box using argon as the carrier gas. The bomb calorimeter was then placed in an oven, the temperature of which was brought to 290° C. over 5 hours and maintained at this value for 80 hours. The oven was then rapidly cooled, the pellet was recovered and milled in order to characterize it via XRD. The XRD diagram is represented in FIG. 25. It shows that the compound obtained is NaFeSO$_4$F and crystallizes into a monoclinic lattice (space group P2$_1$/c) with the following parameters: a=6.6798(2) (Å), b=8.7061(2) (Å), c=7.19124(18) (Å), b=113.517(2) (Å) and V=383.473 (Å$^3$).

EXAMPLE 14

Synthesis of NaCoSO$_4$F

In a mortar, 0.855 mg of CoSO$_4$.H$_2$O monohydrate was mixed manually with 245 ma of NaF, which corresponds to a 10% excess of NaF relative to the stoichiometric amounts. The powder was pelleted under a pressure of 10 000 psi, then the pellet was introduced into a Parr bomb calorimeter that was assembled in a thy box using argon as the carrier gas. The bomb calorimeter was then placed in an oven, the temperature of which was brought to 300° C. over 5 hours and maintained at this value for 1 week. The oven was then rapidly cooled, the pellet was recovered and milled in order to characterize it via XRD. The XRD diagram is represented in FIG. 26. It shows the predominant presence of the NCoSO$_4$F phase which crystallizes in the space group P2$_1$/c with the lattice parameters a=6.645(2) Å, b=8.825(2) Å, c=7.162(2) Å, β=112.73(3) and V=387.38(3) Å$^3$.

EXAMPLE 15

Preparation of FeSO$_4$F

The compound was prepared by chemical delithiation of LiFeSO$_4$F with NO$_2$OF$_4$ in acetonitrile at room temperature. The X-ray diffraction spectrum represented in FIG. 27 shows that the compound crystallizes into a lattice, the parameters of which are:
Triclinic, space group: P−1 (2)
A=5.0682 Å, b=5.0649 Å, c=7.255 Å
α=69.36°, β=68.80°, γ=88.16°
V=161.52 Å$^3$.

EXAMPLE 18

Electrochemical Tests

Samples of compound LiFeSO$_4$F, prepared according to example 3, were tested as a positive electrode material in a Swagelok cell in which the electrode is a lithium foil, the two electrodes being separated by a polypropylene separator soaked by a 1M solution of LiPF$_6$ in a 1/1 ethylene carbonate/dimethyl carbonate EC-DMC mixture. To produce a positive electrode, 80 mg of LiFeSO$_4$F (in the form of particles having a mean diameter of 1 μm) and 20 mg of carbon were mixed by mechanical milling in an SPEX 1800 mill for 15 minutes. An amount of mixture corresponding to 8 mg of LiFeSO$_4$F per cm$^2$ was applied to an aluminum current collector.

In FIG. 28a, the main curve represents the variation of the potential as a function of the insertion rate of lithium, during the cycling of the cell at a C/10 regime, and the insert represents the change in the capacity of a cell during the succession of cycles at a C/10 regime, N being the number of cycles.

FIG. 28b represents the variation of the potential as a function of the insertion rate of lithium, during the cycling of the cell at a C/2 regime.

FIG. 28c represents the variation of the capacity of a cell as a function of the cycling regime R.

It thus appears that the capacity remains at 90% at a C/2 regime and at 67% at a C/10 regime.

EXAMPLE 19

Electrochemical Test

An LiFeSO$_4$F sample prepared according to example 12 was subjected to an electrochemical test. An LiFeSO$_4$F (ceramic)/carbon (acetylene black) composite material in an 85/15 weight proportion was prepared by mechanical milling for 15 min in an SPEX® mill. This composite material was applied to an aluminum current collector and it was mounted in a cell in which the negative anode is a lithium foil and the electrolyte is a commercial electrolyte of LP30 type. The cell thus obtained was cycled in the potential window [2.5 V-4.5 V] under a C/5 regime (1 electron exchanged over 5 hours). The results of the electrochemical tests are represented in FIG. 29, in which the left-hand curve represents the variation of the potential as a function of the lithium ion content in the fluorosulfate, and the right-hand curve represents the variation of the capacity as a function of the number of cycles. It appears that the material electrochemical activity is centered in the vicinity of 3.6 V, with a reversible capacity of around 80 mAh/g which is stable at least in the first 5 cycles.

EXAMPLE 20

Electrochemical Test

An NaFeSO$_4$F sample prepared according to example 13 was tested under the conditions of example 19. The cycling curve is represented in FIG. 30. It shows that the material has an electrochemical activity similar to that of the corresponding material prepared in an ionic liquid medium. In particular, the phase the reactivity with respect to Li is limited to 0.2 Li per formula unit, irrespective of the preparation process.

The invention claimed is:

1. A process for preparing a material, having particles of a fluorinated compound which has a distorted tavorite structure and which corresponds to the following formula (I):

in which
A represents Li or Na;
A' represents a vacancy or at least one dopant element;
Z represents at least one element chosen from Fe, Co and Ni;
Z' represents a vacancy or at least one dopant element;
the indices a, b, x, z, s, and f are chosen so as to ensure the etectroneutrality of the compound, and 1≥a≥0, 1>b≥0, x≥0, z>0, s>0, f>0;
the respective amounts a and b of dopant A and Z' are such that the tavorite structure is preserved, wherein said method comprises the steps of:
dispersing precursors of the elements which form said material of formula (I) in a support liquid comprising at least one ionic liquid consisting of a cation and of an anion, the electric charges of which are balanced, in order to obtain a suspension of said precursors in said liquid;

ii) heating said suspension to a temperature of 25 to 330° C.;
iii) separating said ionic liquid and the material of formula (I) resulting from the reaction between said precursors.

2. The process as claimed in claim 1, wherein the amount of precursors present within the ionic liquid during step i) is from 0.01% to 85% by weight.

3. The process as claimed in claim 1, wherein the precursor of A or A' is chosen from inorganic acid salts, volatile organic acid salts, heat-decomposable acid salts, fluorides and sulfates.

4. The process as claimed in claim 1, wherein the precursor of a Z or Z' element is chosen from the sulfates of Z or of Z' that have a tavorite structure.

5. The process as claimed in claim 1, wherein the precursor of Z and, where appropriate, of Z' is a monohydrate $ZSO_4 \cdot H_2O$ or $Z'SO_4 \cdot H_2O$ or a mixed monohydrate $Z_{1-b}Z'_b SO_4 \cdot H_2O$, and the precursor of A and, where appropriate, of A' is a fluoride.

6. The process as claimed in claim 5, wherein an excess of fluoride of 5% to 25% is used.

7. The process as claimed in claim 1, wherein the ionic liquid is 1-butyl-3-methylimidazolium trifluoromethanesulfonate or 1-ethyl-3-methylimidazolium bis(trifluoromethanesulfonyl)imide.

8. The process as claimed in claim 1, wherein the heating step ii) is carried out under an inert atmosphere, at atmospheric pressure.

9. The process as claimed in claim 1, wherein A' is an alkali et different from A, an alkaline-earth metal or a 3d metal.

10. The process as claimed in claim 1, wherein Z' is a metal chosen from alkali metals, Mn, Mg, Ca, Sc, Ti, V, Cr, Zn, Al, Ga, Sn, Zr, Nb and Ta in at least one of their degrees of oxidation.

11. The process as claimed in claim 1, wherein said material corresponds to one of the formulae $Li(Z_{1-b}Z'_b)_z SO_4 F$ and $Na(Z_{1-b}Z'_b)_z SO_4 F$.

12. The process as claimed in claim 1, wherein said material corresponds to the formula $(Z_{1-b}Z'_b)_z (SO_4)_s F_f$.

* * * * *